(12) United States Patent
Gotlund et al.

(10) Patent No.: US 12,454,294 B2
(45) Date of Patent: Oct. 28, 2025

(54) SYSTEMS AND METHODS FOR VERIFYING RAILCAR LOCATION

(71) Applicant: TTX Company, Chicago, IL (US)

(72) Inventors: Erik L. Gotlund, Green Oaks, IL (US); David P. Cannon, Chicago, IL (US); Michael E. Antonakakis, Colorado Springs, CO (US); Thomas M. Kingsley, Chicago, IL (US)

(73) Assignee: TTX Company, Chicago, IL (US)

( * ) Notice: Subject to any disclaimer, the term of this patent is extended or adjusted under 35 U.S.C. 154(b) by 439 days.

(21) Appl. No.: 17/154,793

(22) Filed: Jan. 21, 2021

(65) Prior Publication Data

US 2021/0291883 A1 Sep. 23, 2021

Related U.S. Application Data

(60) Provisional application No. 63/133,010, filed on Dec. 31, 2020, provisional application No. 62/964,726, filed on Jan. 23, 2020.

(51) Int. Cl.
*B61L 25/02* (2006.01)
*B61L 15/00* (2006.01)
(Continued)

(52) U.S. Cl.
CPC ......... *B61L 25/025* (2013.01); *B61L 15/0081* (2013.01); *H04L 67/12* (2013.01);
(Continued)

(58) Field of Classification Search
CPC ............... B61L 25/025; B61L 15/0081; B61L 2205/02; H04L 67/52; H04L 67/53; H04L 67/12
See application file for complete search history.

(56) References Cited

U.S. PATENT DOCUMENTS 6,311,109 B1 10/2001 Hawthorne et al.
6,487,488 B1 11/2002 Peterson, Jr. et al.
(Continued)

FOREIGN PATENT DOCUMENTS

CN 106600951 A 4/2017
CN 107615312 A 1/2018
(Continued)

OTHER PUBLICATIONS

Mar. 17, 2023—(AU) Examination Report—App. No. 2021209920.
(Continued)

*Primary Examiner* — Erin D Bishop
*Assistant Examiner* — Mahmoud M Kazimi
(74) *Attorney, Agent, or Firm* — Banner & Witcoff, Ltd.

(57) ABSTRACT

Systems and methods for remote monitoring and verifying railcar locations in accordance with embodiments of the invention are disclosed. In one embodiment, a computing device for verifying a rail car location includes a processor and a memory storing instructions that, when read by the processor cause the computing device to determine a car load state change for a rail car, identify an event corresponding to the car load state change, wherein the event includes an event location, determine a car location of the rail car, establish a geofence based on the car location, determine location information based on the geofence, and verify the car location based on the location information and the event location.

20 Claims, 20 Drawing Sheets

(51) Int. Cl.
*H04L 67/12* (2022.01)
*H04L 67/52* (2022.01)
*H04L 67/53* (2022.01)

(52) U.S. Cl.
CPC .............. *H04L 67/52* (2022.05); *H04L 67/53* (2022.05); *B61L 2205/02* (2013.01)

(56) References Cited

U.S. PATENT DOCUMENTS

| | | | |
|---|---|---|---|
| 6,490,523 | B2 | 12/2002 | Doner |
| 6,622,067 | B1 | 9/2003 | Lovelace, II et al. |
| 6,668,216 | B2 | 12/2003 | Mays |
| 6,691,064 | B2 | 2/2004 | Vroman |
| 6,837,550 | B2 | 1/2005 | Dougherty et al. |
| 7,685,884 | B2 | 3/2010 | Degutis et al. |
| 7,688,218 | B2 | 3/2010 | LeFebvre et al. |
| 7,698,962 | B2 | 4/2010 | LeFebvre et al. |
| 7,769,509 | B2 | 8/2010 | Gaughan et al. |
| 8,045,962 | B2 | 10/2011 | Schullian et al. |
| 8,234,917 | B2 | 8/2012 | Burkhart et al. |
| 8,781,671 | B2 | 7/2014 | Beck et al. |
| 8,812,175 | B2 | 8/2014 | Baker |
| 8,874,304 | B2 | 10/2014 | Friesen et al. |
| 8,924,117 | B2 | 12/2014 | Kull |
| 9,020,667 | B2 | 4/2015 | Haas et al. |
| 9,026,281 | B2 | 5/2015 | Murphy et al. |
| 9,365,223 | B2 | 6/2016 | Martin et al. |
| 9,403,517 | B2 | 8/2016 | Kernwein et al. |
| 9,469,198 | B2 | 10/2016 | Cooper et al. |
| 9,981,673 | B2 | 5/2018 | Martin et al. |
| 10,081,377 | B2 | 9/2018 | Shubs, Jr. et al. |
| 10,137,915 | B2 | 11/2018 | LeFebvre et al. |
| 2003/0060938 | A1* | 3/2003 | Duvall ................ B60R 25/1012 701/2 |
| 2006/0047419 | A1* | 3/2006 | Diendorf ................ G01C 21/26 340/552 |
| 2009/0299550 | A1 | 12/2009 | Baker |
| 2012/0046811 | A1 | 2/2012 | Murphy et al. |
| 2013/0245880 | A1* | 9/2013 | McQuade ............ G07C 5/0808 701/32.4 |
| 2013/0342362 | A1 | 12/2013 | Martin |
| 2014/0060979 | A1 | 3/2014 | Martin et al. |
| 2014/0263895 | A1 | 9/2014 | Dickenson et al. |
| 2015/0099461 | A1* | 4/2015 | Holden .............. G01C 21/3682 455/39 |
| 2015/0183445 | A1 | 7/2015 | Gotlund et al. |
| 2015/0219487 | A1 | 8/2015 | Maraini |
| 2015/0232079 | A1 | 8/2015 | Martin et al. |
| 2016/0082988 | A1 | 3/2016 | Kurz |
| 2016/0272228 | A1* | 9/2016 | LeFebvre ................ H04L 67/12 |
| 2016/0325767 | A1 | 11/2016 | LeFebvre et al. |
| 2017/0084094 | A1 | 3/2017 | Worden et al. |
| 2017/0210401 | A1 | 7/2017 | Mian |
| 2017/0297595 | A1 | 10/2017 | Ryan |
| 2017/0343377 | A1 | 11/2017 | Holden et al. |
| 2018/0222504 | A1* | 8/2018 | Birch .................... B61L 23/044 |
| 2020/0103269 | A1 | 4/2020 | Bell |
| 2021/0291883 | A1 | 9/2021 | Gotlund et al. |
| 2022/0119021 | A1 | 4/2022 | Gotlund et al. |
| 2023/0171525 | A1 | 6/2023 | Ramasundaram et al. |

FOREIGN PATENT DOCUMENTS

| | | |
|---|---|---|
| CN | 110264580 A | 9/2019 |
| EP | 1535418 B1 | 11/2007 |
| EP | 4093648 A1 | 11/2022 |
| EP | 4271602 A1 | 11/2023 |
| KR | 20160000031 A | 1/2016 |
| WO | 2021150908 A1 | 7/2021 |
| WO | 2022147337 A1 | 7/2022 |

OTHER PUBLICATIONS

Apr. 4, 2022—(WO) International Search Report & Written Opinion—PCT/US21/065801.
Sawley K et al: "The effect of hollow-worn wheels on vehicle stability in straight track," Wear, Elsevier Sequoia, Luasanne, CH, vol. 258, No. 7-8, Mar. 1, 2005 (Mar. 1, 2005), pp. 1100-1108, XP004731843, ISSN: 0043-1648, DOI: 10.1016/J.WEAR.2004.03.058.
Nov. 23, 2022—(IN) Examination Report—App. No. 202247047658.
Aug. 8, 2023—(EP) Rules 161(1) and 162 EPC Communication—App 21841161.9.
Sep. 27, 2023—(CA) 1st Office Action—App 3,165,833.
Dec. 18, 2023—(CN) 1st Office Action—App 202180023332.X.
Dec. 13, 2023—(US) Non-Final Office Action—U.S. Appl. No. 18/203,485.
Dec. 18, 2023—(US) Non-Final Office Action—U.S. Appl. No. 18/203,447.
Apr. 15, 2024—(CN) Notice of Grant and Registration—App 202180023332.X.
Jul. 26, 2024—(US) Non-Final Office Action—U.S. Appl. No. 18/203,447.
Jul. 1, 2024—(US) Final Office Action—U.S. Appl. No. 18/203,485.
Oct. 25, 2024—(CA) 1st Office Action—App 3,203,906.
Nov. 26, 2024—(WO) Int. Search Report & Written Opinion—App. No. PCT/US24/42797.
Sep. 4, 2025—(EP) Exam Report—App. No. 21707057.2.
Jul. 8, 2025—(CA) Notice of Allowance—App. No. 3,165,833.

* cited by examiner

SYSTEMS AND METHODS FOR VERIFYING RAILCAR LOCATION

CROSS-REFERENCE TO RELATED APPLICATIONS

The instant application claims priority to U.S. Provisional Patent Application No. 63/133,010, titled "Systems and Methods for Remote Monitoring" and filed Dec. 31, 2020, and U.S. Provisional Patent Application No. 62/964,726, titled "Systems and Methods for Remote Monitoring" and filed Jan. 23, 2020, the disclosures of which are hereby incorporated by reference in their entirety.

TECHNICAL FIELD

The present invention is generally related to data processing and more specifically the tracking and analysis of geographically distributed objects.

BACKGROUND

Rail transportation includes a variety of locomotive and rail cars that travel throughout a rail system. These locomotives and cars require regular maintenance and repair to stay in service.

SUMMARY OF THE INVENTION

Systems and methods for remote monitoring and verifying railcar locations in accordance with embodiments of the invention are disclosed. In one embodiment, a computing device for verifying a rail car location includes a processor and a memory storing instructions that, when read by the processor cause the computing device to determine a car load state change for a rail car, identify an event corresponding to the car load state change, wherein the event includes an event location, determine a car location of the rail car, establish a geofence based on the car location, determine location information based on the geofence, and verify the car location based on the location information and the event location.

In yet another embodiment of the invention, the car location is generated using a global positioning system receiver installed on the rail car.

In still additional embodiment of the invention, the geofence includes a circular region centered on the car location.

In yet still another embodiment of the invention, the geofence includes a polygonal area established around the car location.

In yet another additional embodiment of the invention, the location information includes at least one location name and corresponding location address obtained from a third-party location service.

In still another additional embodiment of the invention, the event location further includes an event location name and verifying the car location further includes determining the event location name matches the location name.

In yet still another additional embodiment of the invention, the car load state change includes a change from a loaded state of the rail car to an unloaded state of the rail car.

Yet another embodiment of the invention includes a computer-implemented method for verifying a rail car location including determining a car load state change for a rail car, identifying an event corresponding to the car load state change, wherein the event includes an event location, determining a car location of the rail car, establishing a geofence based on the car location, determining location information based on the geofence, and verifying the car location based on the location information and the event location.

In yet another embodiment of the invention, the car location is generated using a global positioning system receiver installed on the rail car.

In still another embodiment of the invention, the geofence includes a circular region centered on the car location.

In yet still another embodiment of the invention, the geofence includes a polygonal area established around the car location.

In yet another additional embodiment of the invention, the location information includes at least one location name and corresponding location address obtained from a third-party location service.

In still another additional embodiment of the invention, the event location further includes an event location name and verifying the car location further includes determining the event location name matches the location name.

In yet still another additional embodiment of the invention, the car load state change includes a change from a loaded state of the rail car to an unloaded state of the rail car.

Still another embodiment of the invention includes a non-transitory machine-readable medium storing instructions that, when executed by one or more processors, cause the one or more processors to perform steps including determining a car load state change for a rail car, identifying an event corresponding to the car load state change, wherein the event includes an event location, determining a car location of the rail car, establishing a geofence based on the car location, determining location information based on the geofence, and verifying the car location based on the location information and the event location.

In yet another embodiment of the invention, the car location is generated using a global positioning system receiver installed on the rail car.

In still another embodiment of the invention, the geofence includes a circular region centered on the car location.

In yet still another embodiment of the invention, the geofence includes a polygonal area established around the car location.

In yet another additional embodiment of the invention, the location information includes at least one location name and corresponding location address obtained from a third-party location service, the event location further includes an event location name, and verifying the car location further includes determining the event location name matches the location name.

In still another additional embodiment of the invention, the car load state change includes a change from a loaded state of the rail car to an unloaded state of the rail car.

Yet another embodiment of the invention includes a computer-implemented method for determining a car load state including determining a rail car is unloaded, the rail car including at least one sensor, obtaining an indication of a time period, determining a tare state of the rail car based on unloaded data obtained from the at least one sensor during the time period, calculating a load level of the rail car based on data obtained from the at least one sensor and the tare state, and determining a car load state for the rail car based on the load level.

In yet another embodiment of the invention, the time period includes a duration and a sampling rate and the unloaded data includes a plurality of samples measured using the at least one sensor at the sampling rate over the duration.

In still another embodiment of the invention, the tare state is determined based on an average of the plurality of samples.

In yet still another embodiment of the invention, the at least one sensor is mounted to the rail car and measures movement of at least one spring of the rail car.

In yet another additional embodiment of the invention, the load level includes a measurement between zero and one hundred, the car load state is unloaded when the load level is less than or equal to thirty, and the car load state is loaded when the load level is greater than or equal to forty.

In still another additional embodiment of the invention, the computer-implemented method further includes calculating the load level by calculating a percentage that the spring has moved relative to a full range of motion of the spring based on a default spring load position.

In yet still another additional embodiment of the invention, the computer-implemented method further includes determining a wear event has occurred with at least one structural element of the rail car and automatically recalculating the tare state based on the determined wear event.

Still another embodiment of the invention includes a computer-implemented method for determining a distance traveled by a rail car including determining a location of a rail car, determining a track location corresponding to the location of the rail car, updating the location based on the track location, determining a route traveled by the rail car, and calculating the distance traveled by the rail car based on the route.

In yet another embodiment of the invention, the location of the rail car is determined based on a location calculated by a global positioning system receiver installed on the rail car.

In still another embodiment of the invention, the track location is obtained from a third-party track service.

In yet still another embodiment of the invention, the computer-implemented method further includes updating the location of the rail car to correspond to a point on the track location closest to the determined location of the rail car.

In yet another additional embodiment of the invention, wherein the route traveled by the rail car is determined based on a known segment of railroad track that includes the track location.

In still another additional embodiment of the invention, the route corresponds to the known segment of railroad track and further includes a starting location of the rail car and the distance traveled is calculated based on a length of the known segment of rail track between the starting location of the rail car and the updated location of the rail car.

Other objects, advantages and novel features, and further scope of applicability of the present invention can be set forth in part in the detailed description to follow, and in part can become apparent to those skilled in the art upon examination of the following, or can be learned by practice of the invention. The objects and advantages of the invention can be realized and attained by means of the instrumentalities and combinations particularly pointed out in the claims.

BRIEF DESCRIPTION OF THE DRAWINGS

The description can be more fully understood with reference to the following figures, which are presented as exemplary embodiments of the invention and should not be construed as a complete recitation of the scope of the invention, wherein.

DETAILED DESCRIPTION

Figure 1:
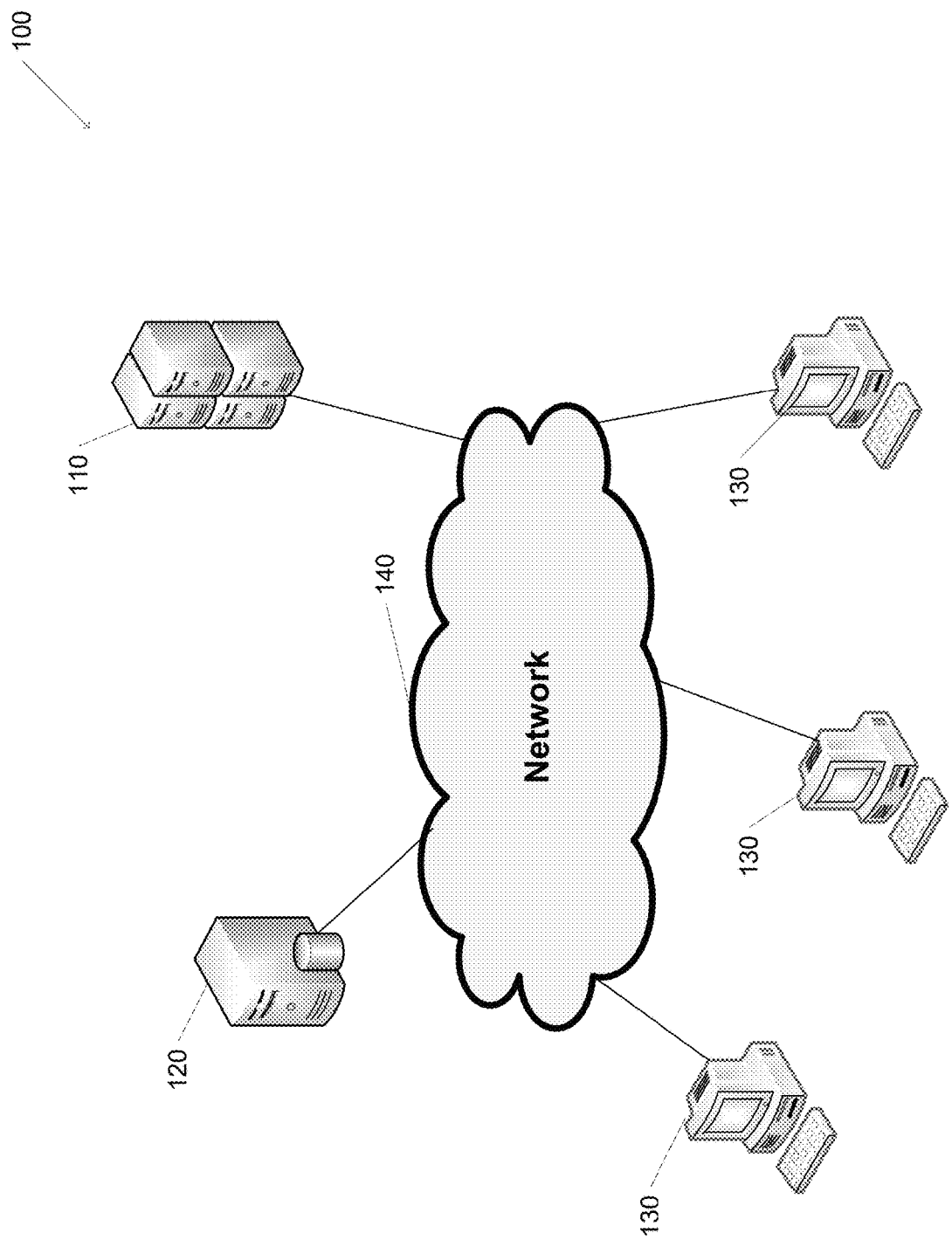
FIG. 1 is a conceptual illustration of a tracking system in accordance with an embodiment of the invention.

Turning now to the drawings, systems and methods for remote monitoring and tracking in accordance with embodiments of the invention are disclosed. The maintenance and repair of rail cars can include having services performed by one of a variety of geographically distributed service centers that is proximate to the rail car at the time the service is called for. Rail cars can also include a variety of components, such as a flat and a rack, which are owned and/or maintained by different entities. For example, a flat (e.g. the wheels and underlying frame of the rail car) can be owned by a first entity while the rack (e.g. the portion of the rail car carrying cargo and attached to the underlying frame) is owned by a second entity. Additionally, sub-systems of the flat car may include truck systems, draft systems, air brake systems, and load securement equipment. In most cases, the flat cars and sub-systems of the flat car are unpowered components. Accordingly, there is a need to monitor the various components of the rail cars and/or provide data to some or all of the entities regarding the status and location of the rail cars.

Remote monitoring systems in accordance with embodiments of the invention can automatically obtain data regarding a variety of objects, such as rail cars, and provide a unified interface for tracking and monitoring a variety of the objects. Portions of the rail car can be fitted with a variety of task tracking devices for monitoring the rail cars and reporting the monitored condition of the rail cars. In several embodiments, the remote monitoring devices are capable of individually obtaining and sending the data. In a variety of embodiments, a primary remote monitoring device can act as a central node that obtains data from a variety of slave remote monitoring devices. The primary remote monitoring device can process and/or transmit the data received from the slave monitoring devices. In a number of embodiments, the role of slave and primary remote monitoring device may rotate between the remote monitoring devices. This can allow for the more efficient use of resources, such as battery power, to prolong the operation of the remote monitoring system. The monitoring devices may communicate with a remote monitoring server system via a network connection, such as a cellular network. In many embodiments, the remote monitoring devices include a short-range communication device capable of communicating with nearby remote monitoring devices in a power-efficient manner. Short-range communications can be performed using any of a variety of techniques such as, but not limited to, Bluetooth, Bluetooth Low Energy, LoRa, LoRaWAN, ZigBee, 802.15, 900 MHz, and/or other typical IoT protocols.

Cellular data backhaul provides the benefit of widespread data coverage, but with moderate power usage while sending data. For this reason, the remote monitoring devices can be programmed to minimize power usage. Several strategies can be employed. Remote monitoring devices can use a low-power mode to decrease average power usage. Between sensor data collection and data transmission events, remote monitoring devices can enter a low-power mode, where modules (e.g. cell radio, GPS, sensors) are put into low-power standby modes or turned off completely. Cellular communication requires significant time for the device to connect to towers before sending data, representing significant overhead even for small messages. For a given cellular protocol, average power usage scales nearly linearly with the frequency of data transmissions, and is less sensitive to the size of transmissions. Therefore, the strategy used to control power usage and ensure long battery life involves limiting the frequency of data transmission. Transmission frequency for the remote monitoring devices can change based on device condition, e.g. car load status only changes while stationary, so it is checked and transmitted more frequently when the device is not moving. Considering that cell transmission frequency is a much more critical driver of power usage than individual message size, remote monitoring devices are programmed to collect data more frequently than they transmit data: For example, remote monitoring devices can check load status every hour, but only transmit the data every 12 hours in a single message containing all data from the previous 12 hours, saving power that would have been used on cellular overhead if sent each hour. In several embodiments, a status may be associated with a priority level and messages may be sent out based on the priority level. For example, if a load status associated with a high priority event is obtained by a remote monitoring device, the remote monitoring device may override a low-power operating mode and transmit the data immediately instead of on a 12-hour schedule.

Remote monitoring devices may include a variety of sensors for obtaining data regarding an object, such as a rail car and/or the remote monitoring device itself. The sensor data can include, but is not limited to, battery level, car location, car speed, altitude, GPS accuracy, environmental information, temperature, humidity, air pressure, distance measurements, force measurements, and/or time-of flight. Distance measurements can be used to determine door status, such as open or closed, and/or for monitoring car loading. Car loading can be calculated based on measured spring compression in the trucks by measuring distance from car body to side frame as the car body moves vertically in relation to side frame as load changes. More generally, loading can be measured based on the distance between any part of the sprung mass of the railcar and a fixed point vertically (such as the side frame, wheelset, rail, tie, ground, etc.) Time of flight can be determined by emitting a laser beam towards the measured object (e.g. side frame) and measuring the amount of time that elapses before a reflection of the laser beam is detected by a laser collector. A self-contained array of laser collection sensors can be used to create a low-resolution image (e.g. 16×16), where each individual collector includes information on the intensity of the received laser reflection. This can improve the time of flight calculations by decreasing error and/or handling irregular target surfaces. Time of flight can also be determined using visible and/or infrared sensors. One or more LEDs can emit several short pulses of light towards the target surface and measures the amount of time that elapses before reflections of the light pulses are detected by a light collector. The emitted pulse pattern can be used to increase accuracy by ensuring the emitted and received pulses are properly time-synced/phased. In a variety of embodiments, distance may be measured using non-contact ultrasonic measurement transducers.

Remote Monitoring Systems

Remote monitoring systems in accordance with embodiments of the invention can obtain a variety of sensor data regarding objects and process that sensor data. A conceptual illustration of a remote monitoring system in accordance with an embodiment of the invention is shown in FIG. 1. The remote monitoring system 100 includes remote monitoring server system 110 connected to third-party database 120 and one or more remote monitoring devices 130 via network 140. In many embodiments, the remote monitoring server system 110 and/or third-party database 120 are implemented using a single server. In a variety of embodiments, remote monitoring server system 110 is implemented using a plurality of servers. In many embodiments, remote monitoring devices 130 are implemented utilizing remote monitoring server system 110. Network 140 can be one or more of a variety of networks, including, but not limited to, wide-area networks, local area networks, and/or the Internet as appropriate to the requirements of specific applications in accordance with embodiments of the invention.

In several embodiments, remote monitoring server system 110 can obtain and store a variety of data via third-party database 120. Third-party database 120 can obtain source data from any of a variety of sources and any of a variety of providers of source data as appropriate to the requirements of specific applications in accordance with embodiments of the invention. In a variety of embodiments, third-party database 120 includes one or more references (such as a uniform resource locator) to data that is stored in a distributed fashion. Remote monitoring server system 110 can obtain data regarding one or more objects from remote monitoring devices 130. Remote monitoring devices 130 can measure data regarding one or more objects and transmit the measured data to remote monitoring server system 110 and/or third-party database 120.

Remote monitoring systems in accordance with embodiments of the invention are described above with respect to FIG. 1; however, it should be appreciated that any of a number of variations can be utilized in accordance with embodiments of the invention. In several embodiments, remote monitoring server systems, databases, and/or remote monitoring devices provide an interface, such as an application programming interface (API) or web service, to transmit and receive some or all of the data to third-party systems for further processing. Access to the interface can be open and/or secured using any of a variety of techniques, such as by using client authorization keys, as appropriate to the requirements of specific applications of the invention.

Remote Monitoring Devices and Server Systems

Figure 2A:
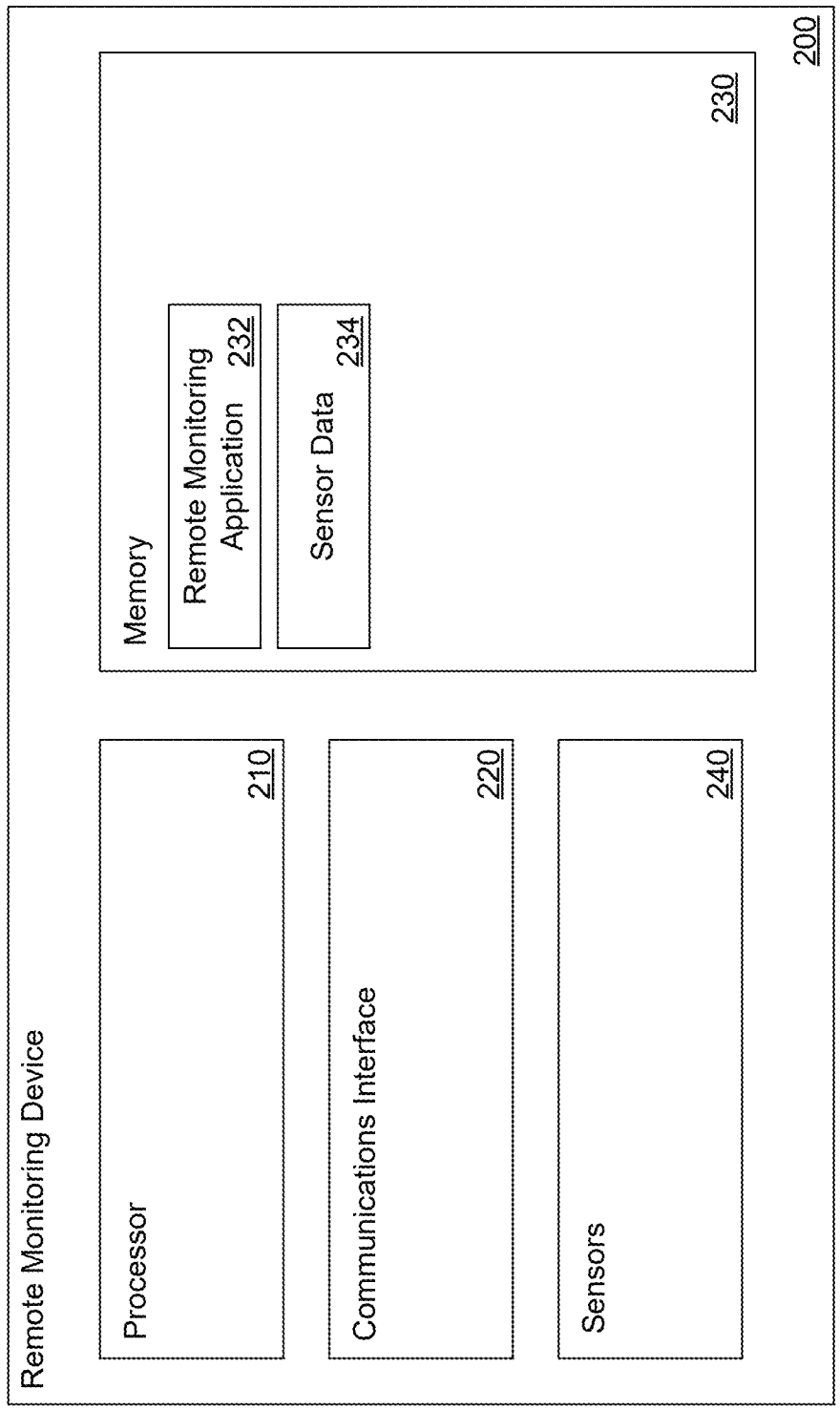
FIG. 2A is a conceptual illustration of tracking device in accordance with an embodiment of the invention.

Remote monitoring systems in accordance with embodiments of the invention include a variety of devices for monitoring a variety of geographically distributed objects. A conceptual illustration of a remote monitoring device in accordance with an embodiment of the invention is shown in FIG. 2A. The remote monitoring device 200 includes a processor 210 in communication with memory 230. The remote monitoring device 200 can also include one or more communication interfaces 220 capable of sending and receiving data and/or a variety of sensors 240 capable of measuring and obtaining a variety of data. In a number of embodiments, the communication interface 220 and/or sensors 240 is in communication with the processor 210 and/or the memory 230. In several embodiments, the memory 230 is any form of storage storing a variety of data, including, but not limited to, a remote monitoring application 232 and sensor data 234. In many embodiments, remote monitoring application 232 and/or sensor data 234 are stored using an external server system and received by the remote monitoring device 200 using the communications interface 220. Sensors 240 may include sensors for energy harvesting/recharging, location determination devices such as global positioning system (GPS) receivers, distance sensors, temperature sensors, humidity sensors, pressure sensors, force sensors, strain sensors, gyroscopes, accelerometers, and/or any other sensors for sensing particular sensor data as appropriate. The processor 210 can be directed, by the remote monitoring application 232, to perform a variety of remote monitoring processes described herein.

Figure 2B:
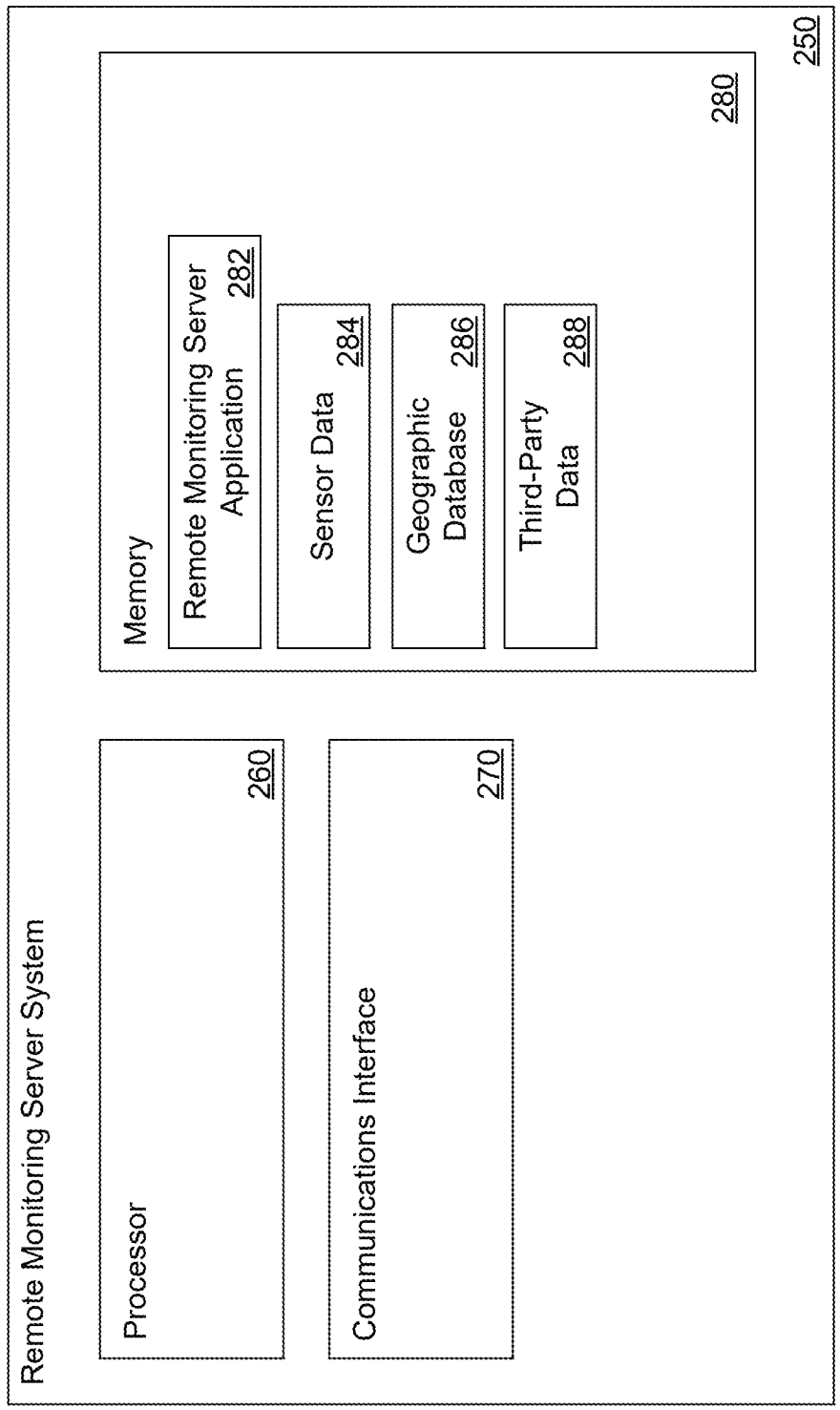
FIG. 2B is a conceptual illustration of a tracking server system in accordance with an embodiment of the invention.

A conceptual illustration of a remote monitoring server system in accordance with an embodiment of the invention is shown in FIG. 2B. The remote monitoring server system 250 includes a processor 260 in communication with memory 280. The remote monitoring server system 250 can also include one or more communications interfaces 270 capable of sending and receiving data with a variety of devices, such as with third-party databases and/or remote monitoring devices. In a number of embodiments, the communication interface 270 is in communication with the processor 260 and/or the memory 280. In several embodiments, the memory 280 is any form of storage storing a variety of data, including, but not limited to, a remote monitoring server application 282, task status data 284, service center data 286, and third-party data 288. In many embodiments, the task distribution application 282, sensor data 284, a geographic database 286, and/or third-party data 288 are stored using an external server system and received by the remote monitoring server system 250 using the communications interface 270. The processor 260 can be directed, by the remote monitoring server application 282, to perform a variety of remote monitoring processes described herein.

Although specific architectures for remote monitoring devices and remote monitoring server systems in accordance with embodiments of the invention are conceptually illustrated in FIGS. 2A-B, any of a variety of architectures, including those that store data or applications on disk or some other form of storage and are loaded into memory at runtime, can also be utilized. Additionally, any of the data utilized in the system can be cached and transmitted once a network connection (such as a wireless network connection via the communications interface) becomes available. In a variety of embodiments, a memory includes circuitry such as, but not limited to, memory cells constructed using transistors, that store instructions. Similarly, a processor can include logic gates formed from transistors (or any other device) that dynamically perform actions based on the instructions stored in the memory. In several embodiments, the instructions are embodied in a configuration of logic gates within the processor to implement and/or perform actions described by the instructions. In this way, the systems and methods described herein can be performed utilizing both general-purpose computing hardware and by single-purpose devices.

Mounting Devices

Remote monitoring devices may be mounted to various points on an object using a variety of brackets. A car builder or maintenance mechanic can weld the brackets in various locations around each railcar during the build to allow the sensors to function properly. The designs for the brackets focus on ease of manufacture, ease of application, and secure sensor mounting.

Figure 3:
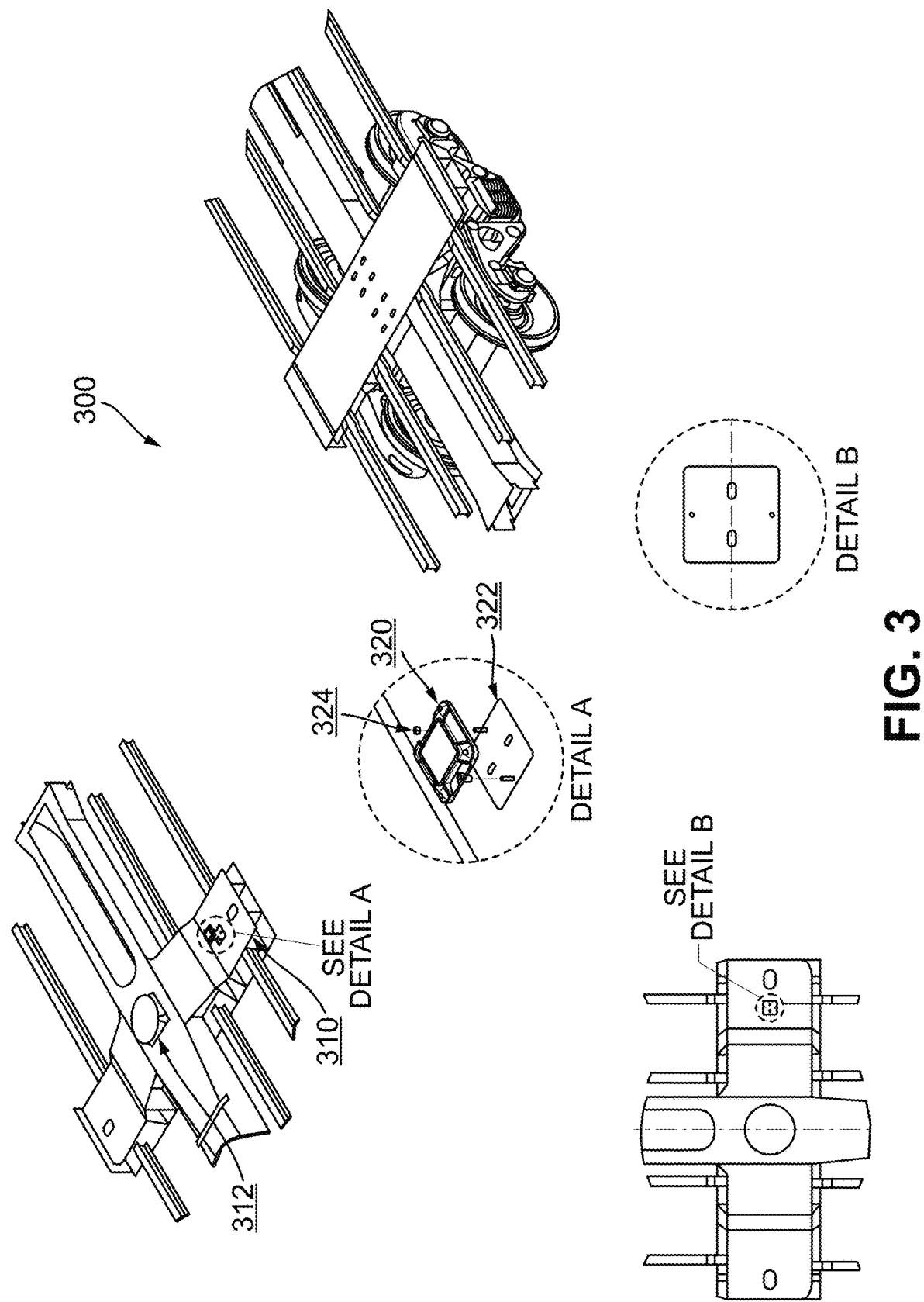
FIGS. 3-8 are illustrations of a variety of bracket designs and mounting locations for remote monitoring devices to measure loading of an object in accordance with embodiments of the invention.
Figure 4:
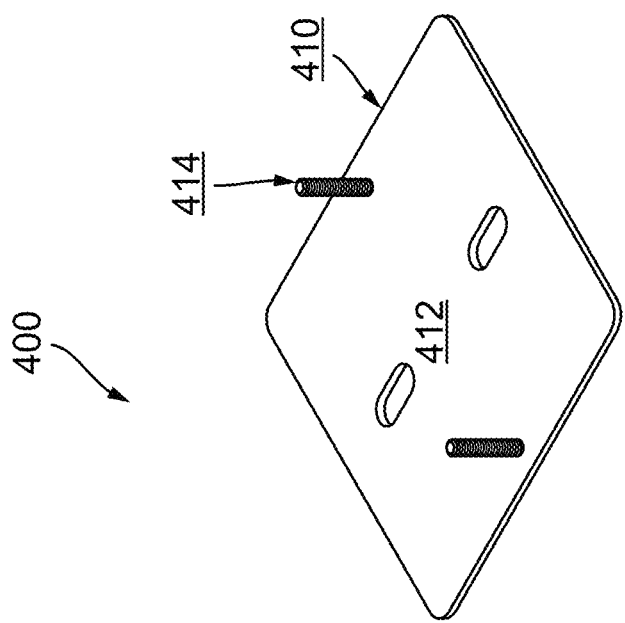
Figure 4:
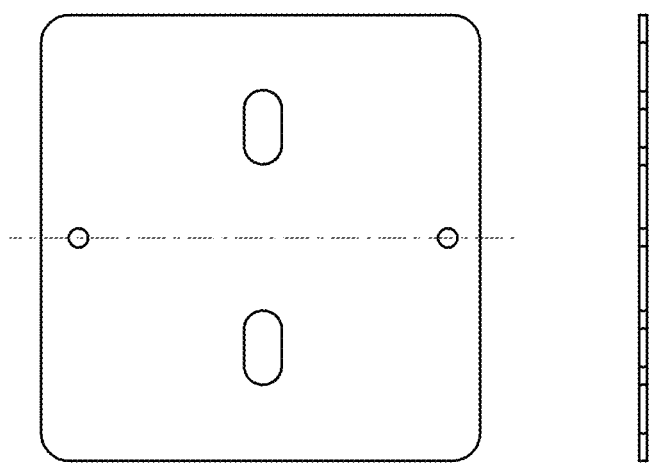
Figure 5:
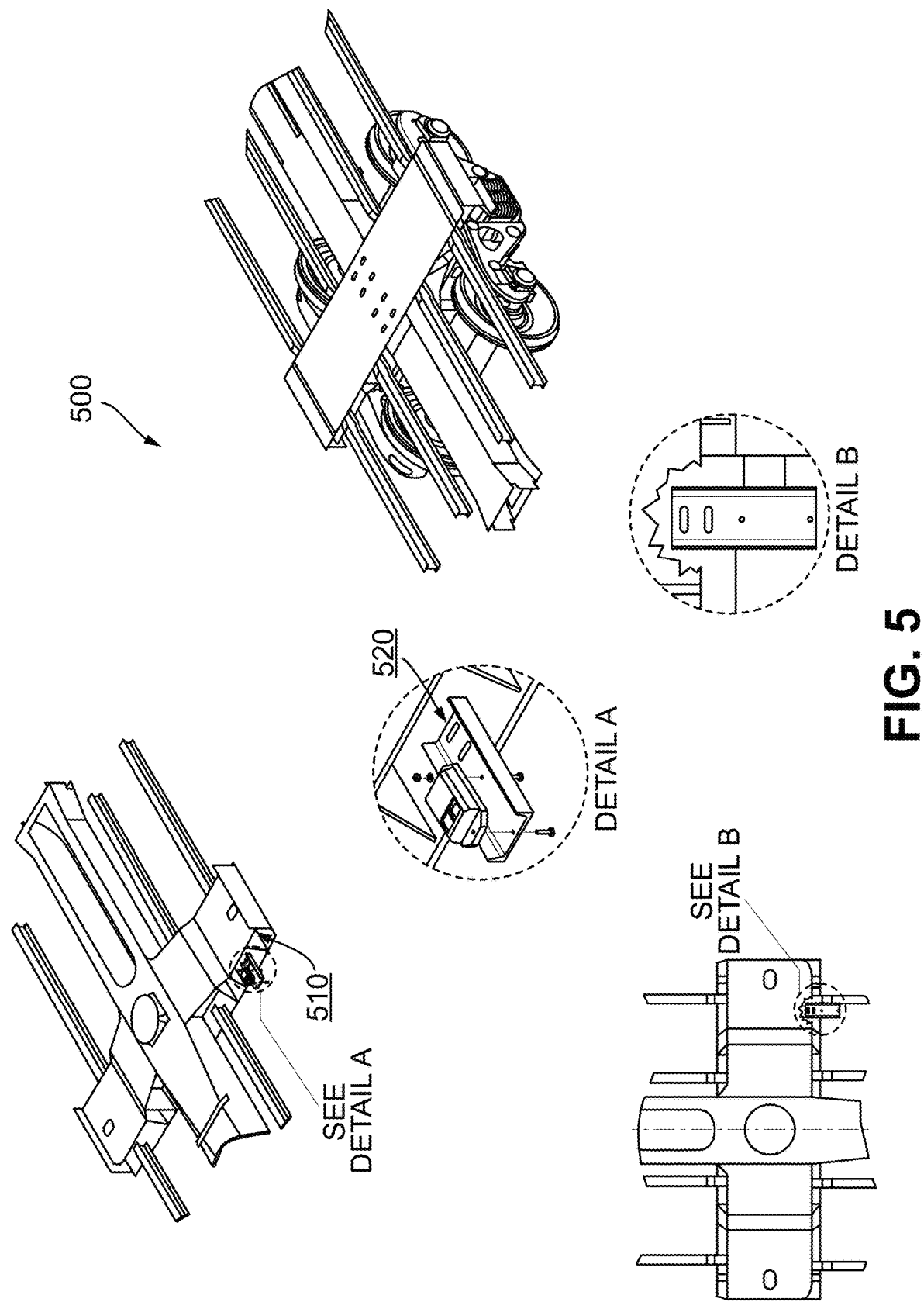
Figure 6:
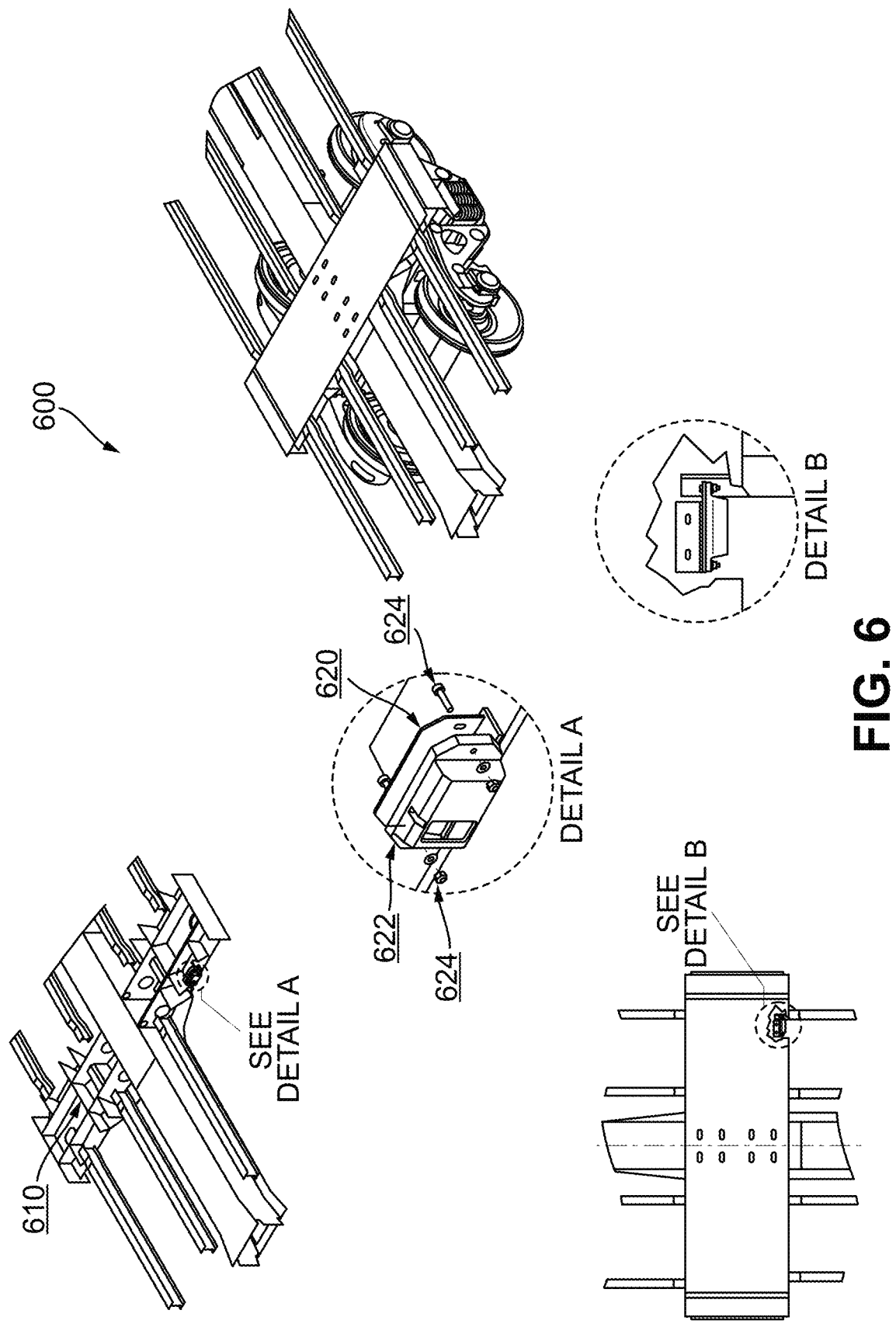
Figure 7:
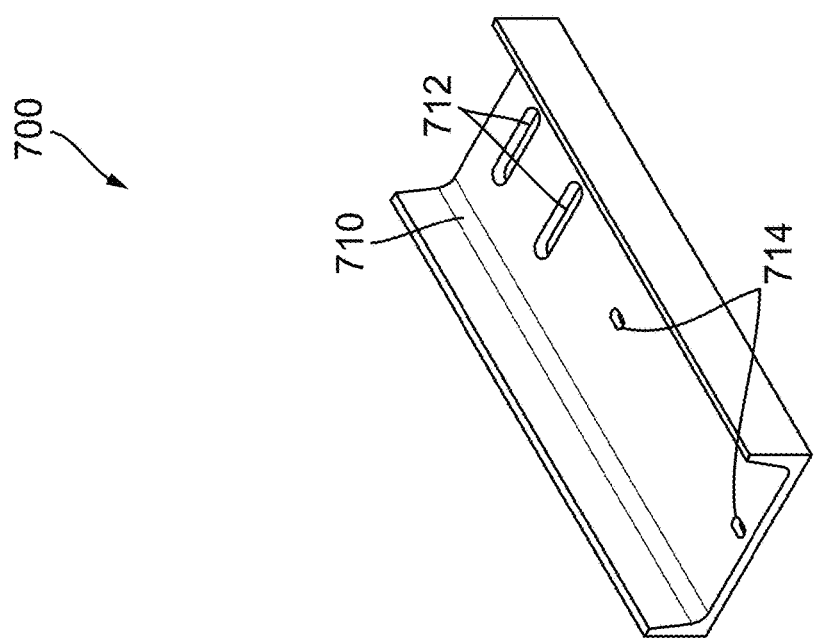
Figure 7:
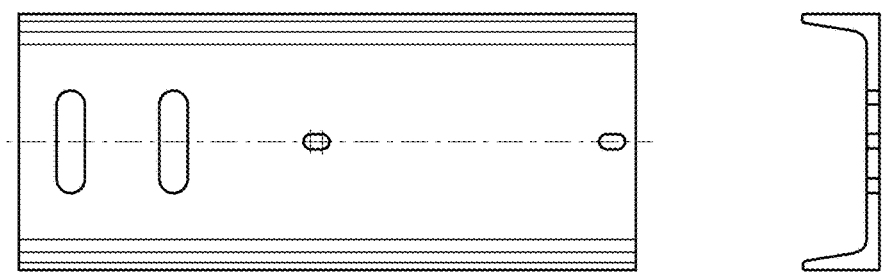
Figure 8:
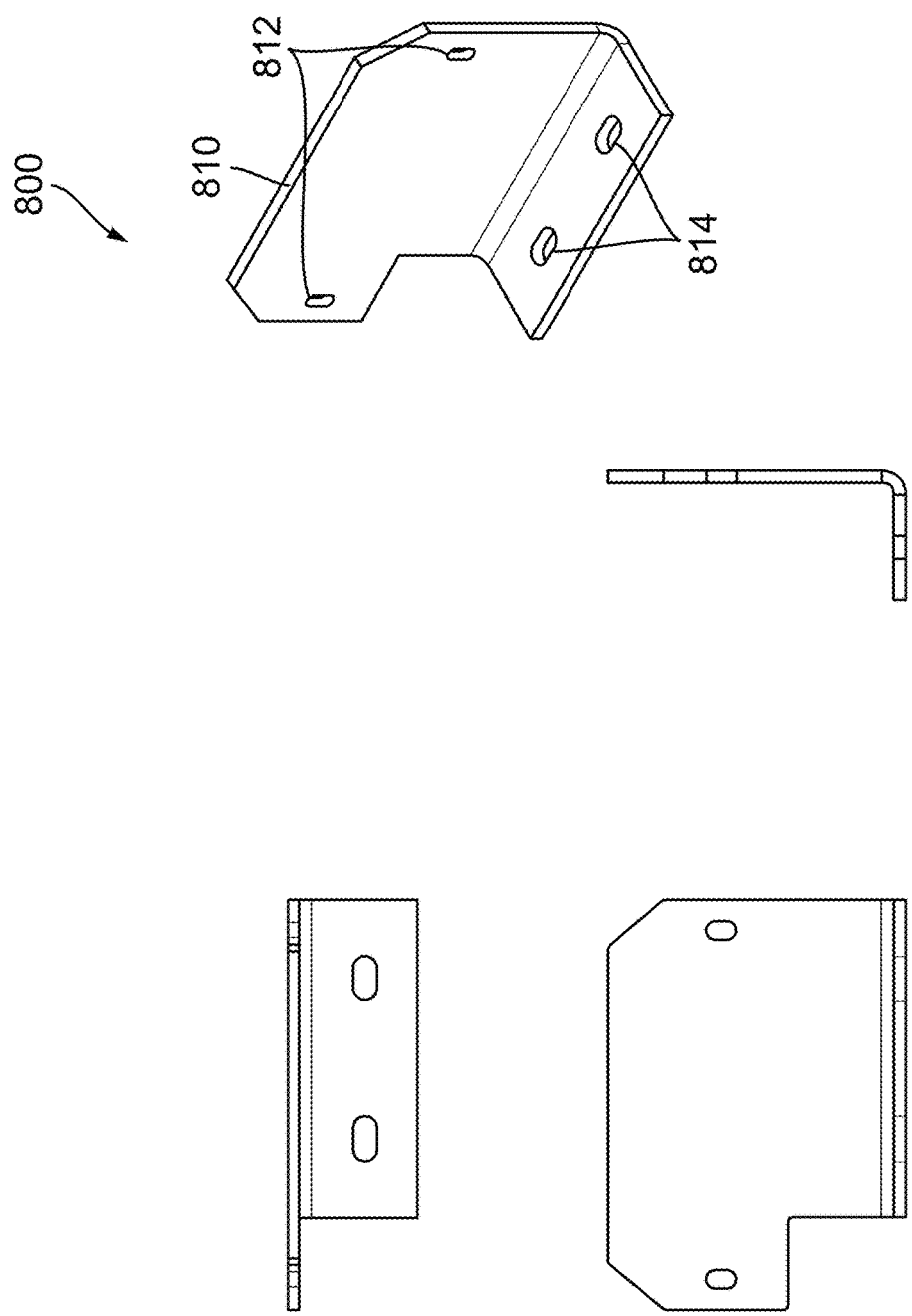

Remote monitoring devices capable of measuring empty load can utilize a direct line of sight to calculate distance information from the sensor to the side frame. A variety of bracket designs and mounting locations for remote monitoring devices to measure empty load are shown in FIGS. 3-8. As shown in FIG. 3, in several embodiments, an empty/load sensor 320 mounts underneath the body bolster 310 facing downward over the side frame and/or angled at the side frame. The bracket 322 can be plug welded along the centerline of the body bolster on one side of the car. The remote monitoring device can fit over two threaded studs and secures with two locknuts 324. As shown in FIG. 4, an empty load bracket 410 can be a flat piece of sheet metal with two slots 412 for welding to the body bolster. It can have two threaded studs 414 for attaching the sensor. As shown in FIG. 5, a bracket 520 can be plug welded to the underside of the top plate of the body bolster 510. As shown in FIG. 6, a bracket 620 can be plug welded to the top side of the bottom plate of the body bolster 610. A remote monitoring device 622 can bolt onto the bracket 620 with two through-slots and secures with two locknuts 624. As shown in FIG. 7, an empty load bracket 710, due to the overhang design of the bracket, may be manufactured from C-channel steel. The heavier gauge design accounts for the increased moment forces and vibration that the location will encounter. The empty load bracket can have two slots 712 for plug welding and two smaller slots 714 for bolting on the remote monitoring device. As shown in FIG. 8, an empty load bracket 810 can include a piece of bent sheet metal with two slots 814 for plug welding to the body bolster with has two additional slots 812 for bolts.

Figure 9:
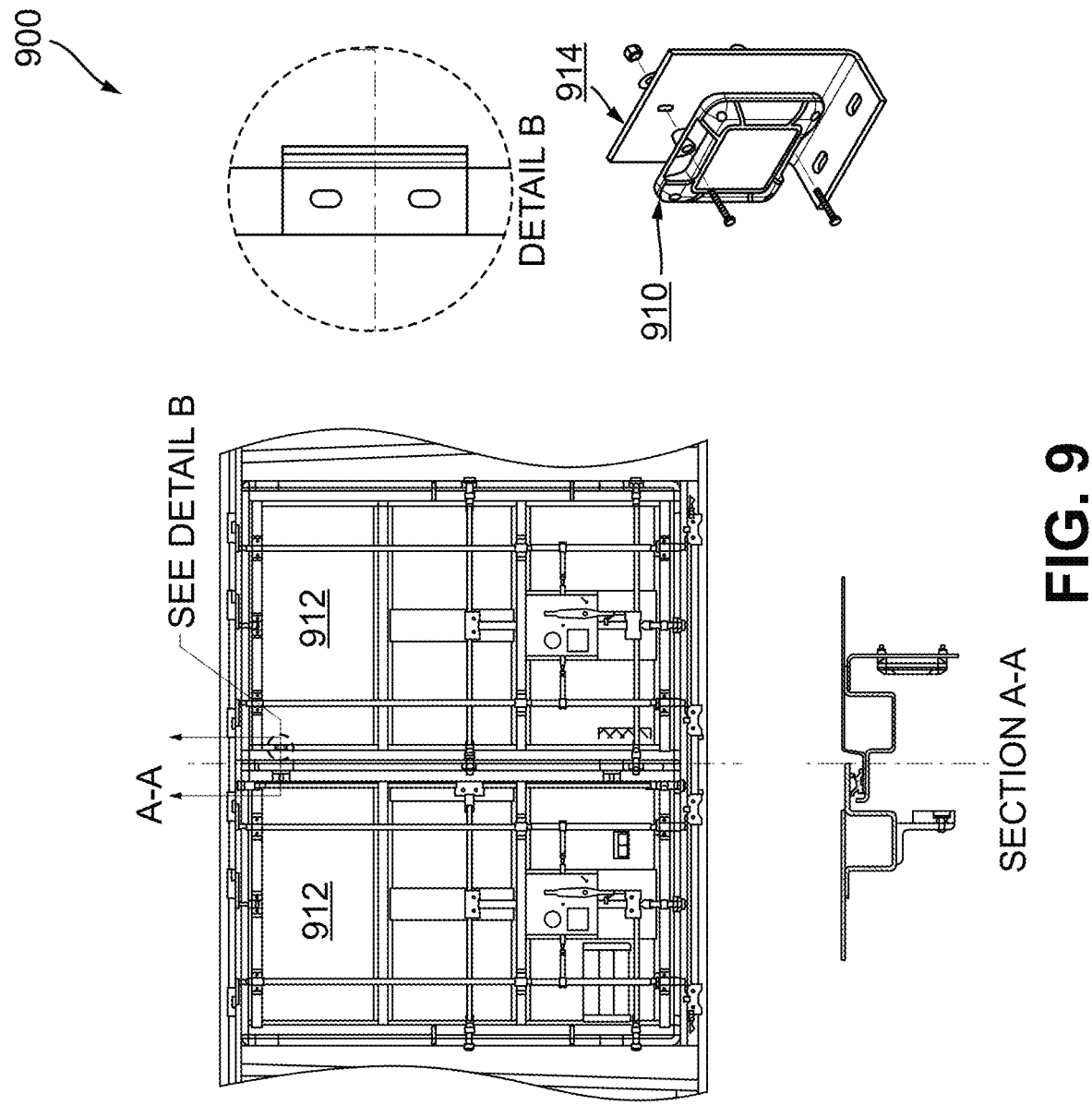
FIGS. 9-12 are illustrations of bracket designs and mounting locations for remote monitoring devices to measure door status in accordance with embodiments of the invention.
Figure 10:
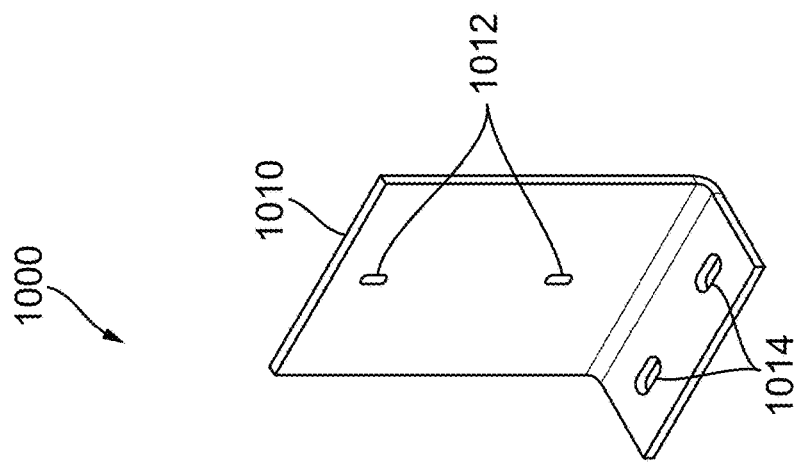
Figure 10:
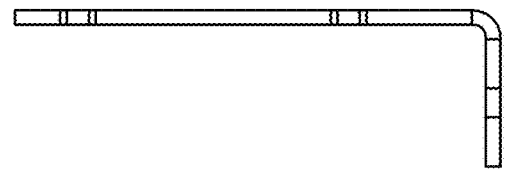
Figure 10:
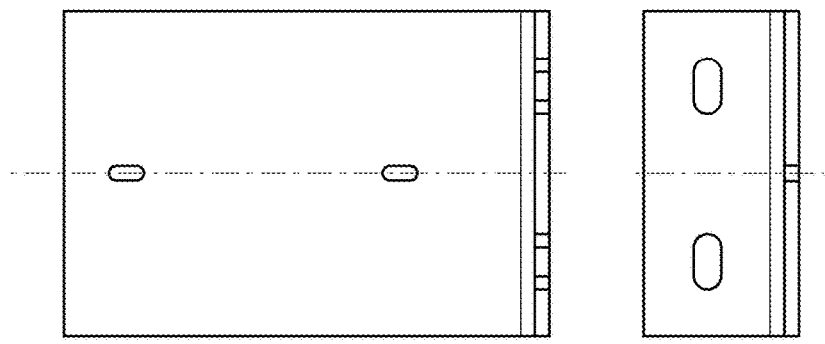
Figure 11:
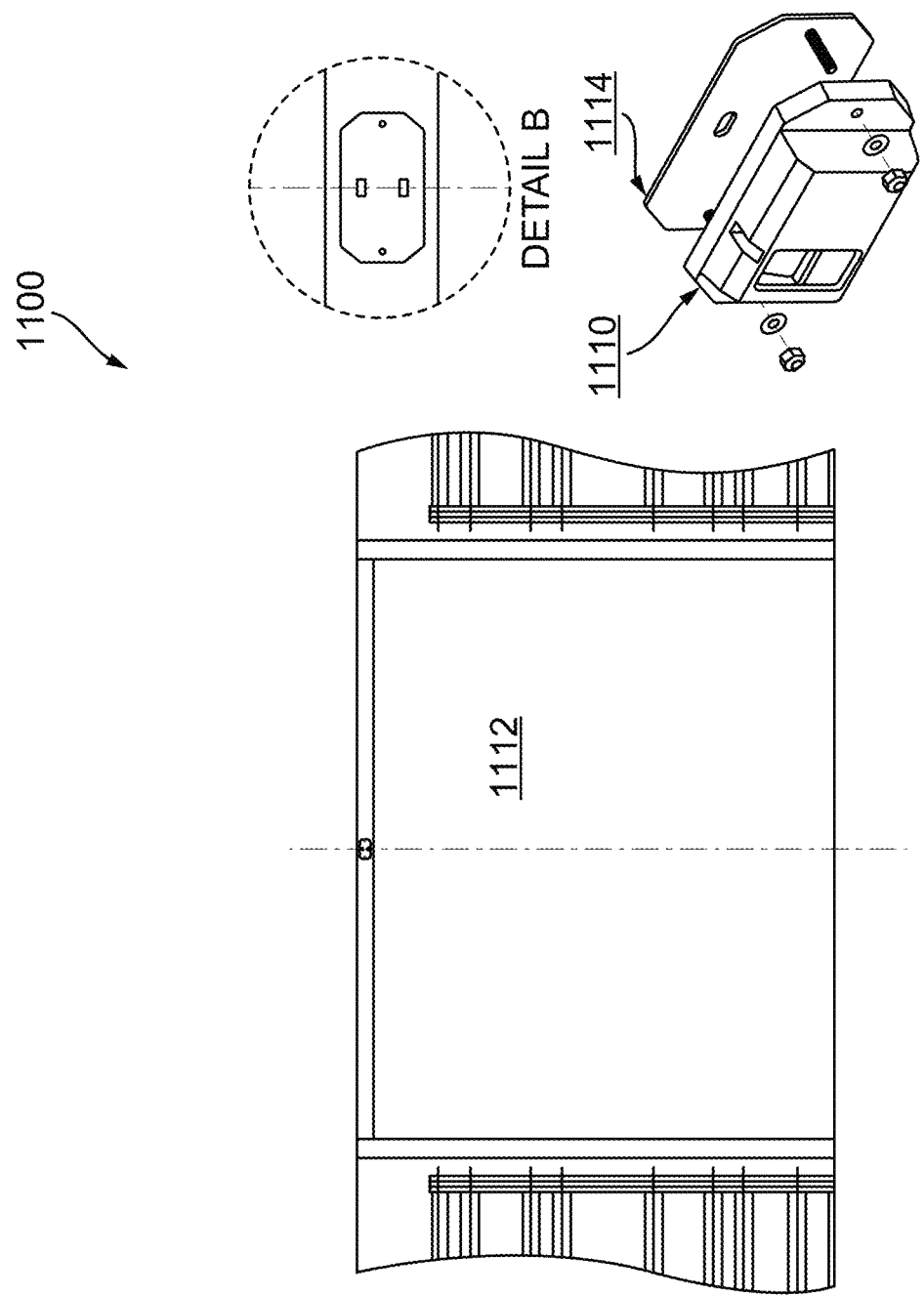
Figure 12:
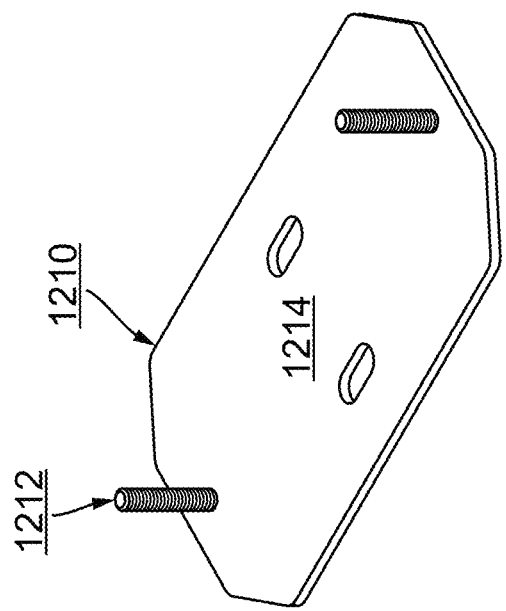
Figure 12:
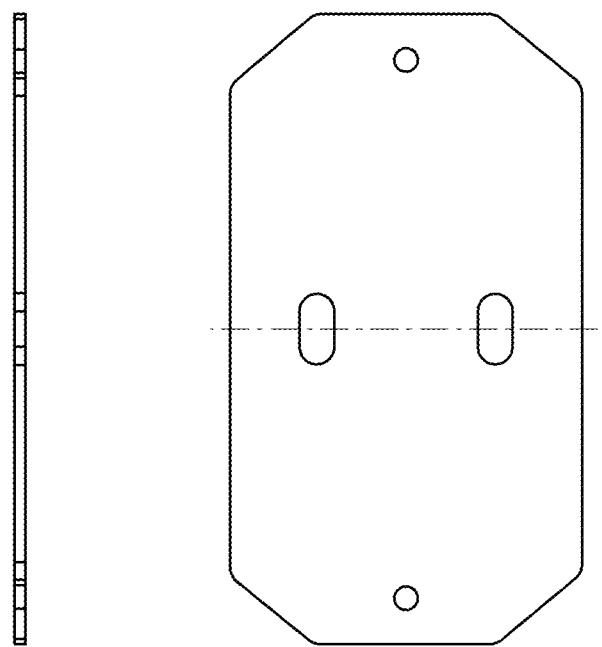

Remote monitoring devices capable of determining the status of a door on an object can be mounted in a variety of locations on the object. A variety of bracket designs and mounting locations for remote monitoring devices to measure door status are shown in FIGS. 9-12. As shown in FIG. 9, a remote monitoring device 910 can mount on a structural member of each auxiliary boxcar door 912, protruding over the member directly across from the doorstop on the main door. The bracket 914 can be plug welded onto the structural member. The remote monitoring device can bolt onto the bracket with two through-slots and secures with two locknuts. As shown in FIG. 10, a door open/close bracket 1010 can be a piece of bent sheet metal with two slots 1014 for plug welding to each auxiliary door of the boxcar with two additional slots 1012 for bolts. As shown in FIG. 11, a remote monitoring device 1110 can mount on the inside wall of one boxcar door opening 1112, just above the opening itself. The bracket 1114 can be plug welded onto the wall. The remote monitoring device can mount over two threaded studs and secures with two locknuts. As shown in FIG. 12, a door open/close bracket 1210 can include a flat piece of sheet metal with two slots 1214 for welding to the door wall along with two threaded studs 1212 for attaching the sensor.

Figure 13:
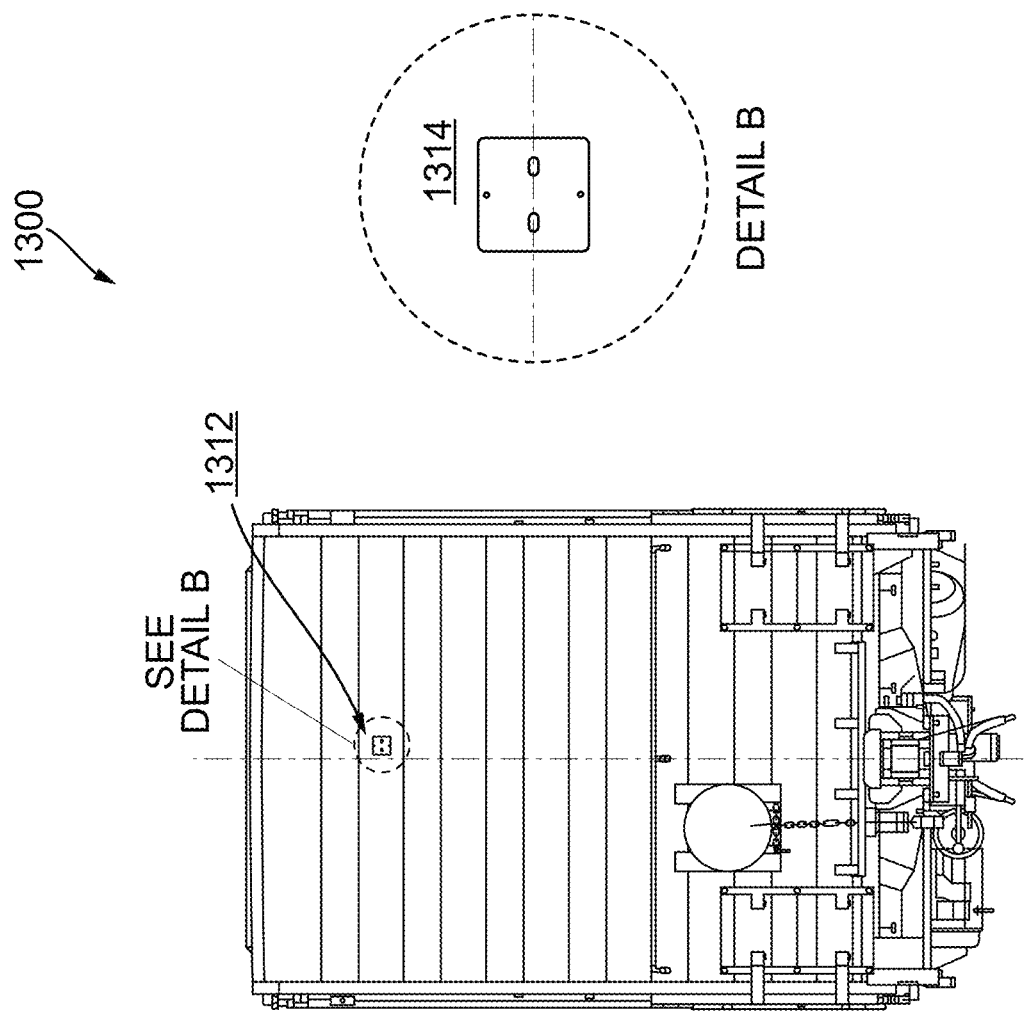
FIGS. 13-15 are illustrations of a variety of bracket designs and mounting locations for remote monitoring devices to measure location of an object in accordance with embodiments of the invention.
Figure 13:
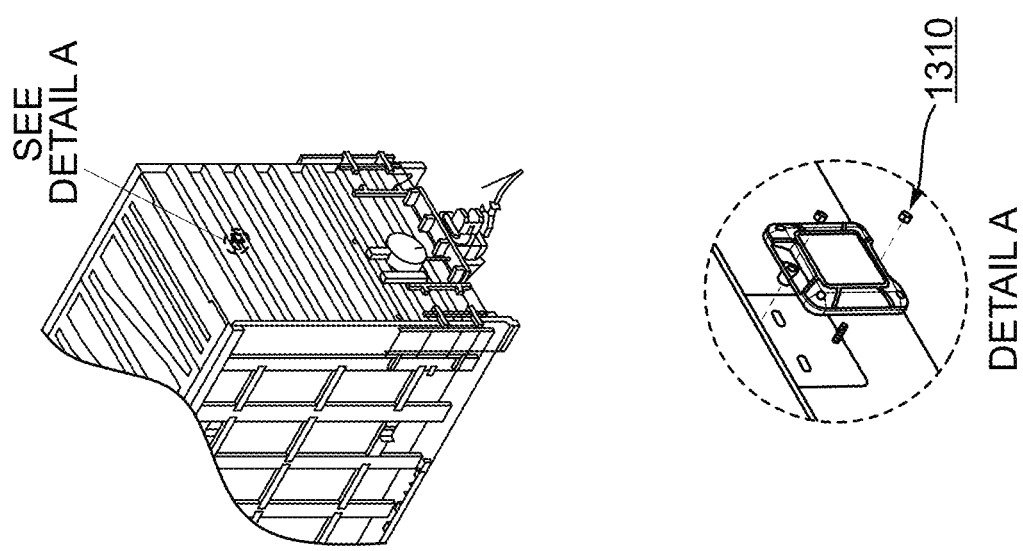
Figure 14:
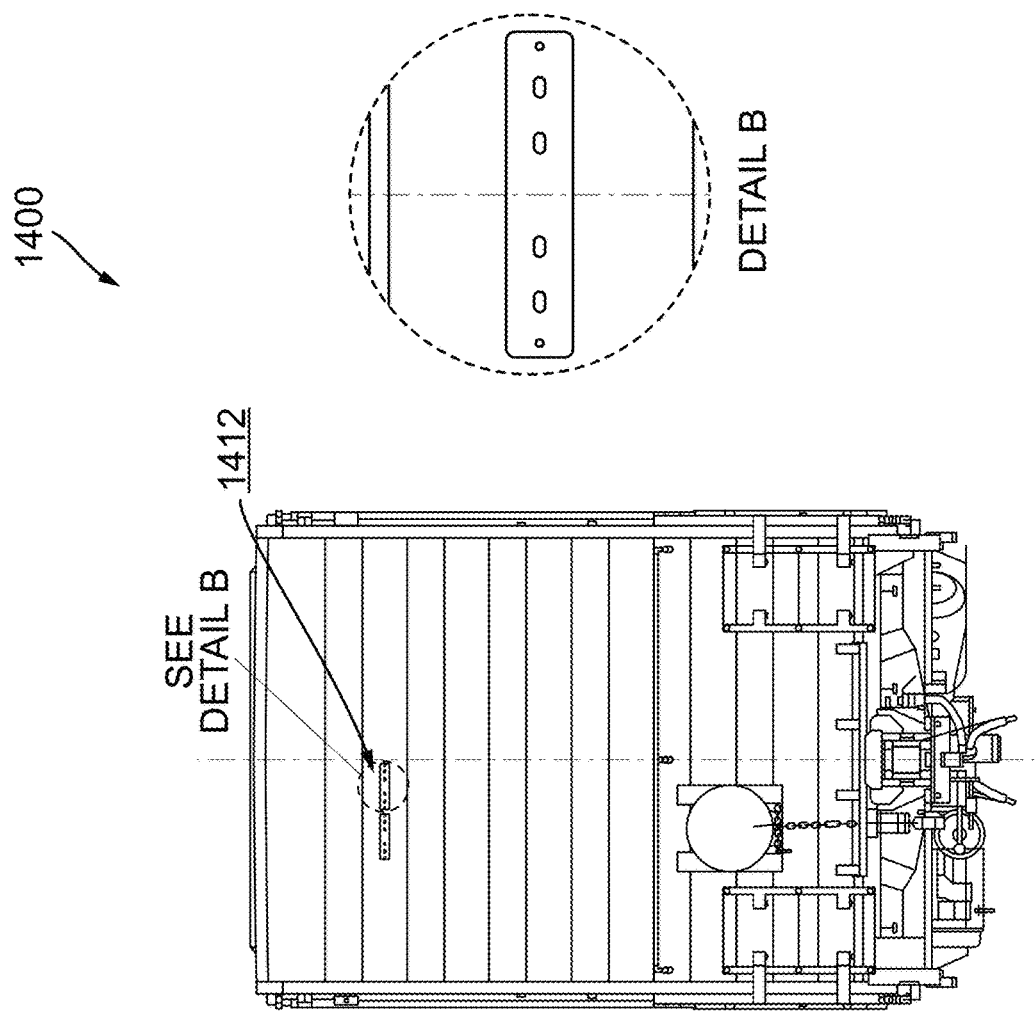
Figure 14:
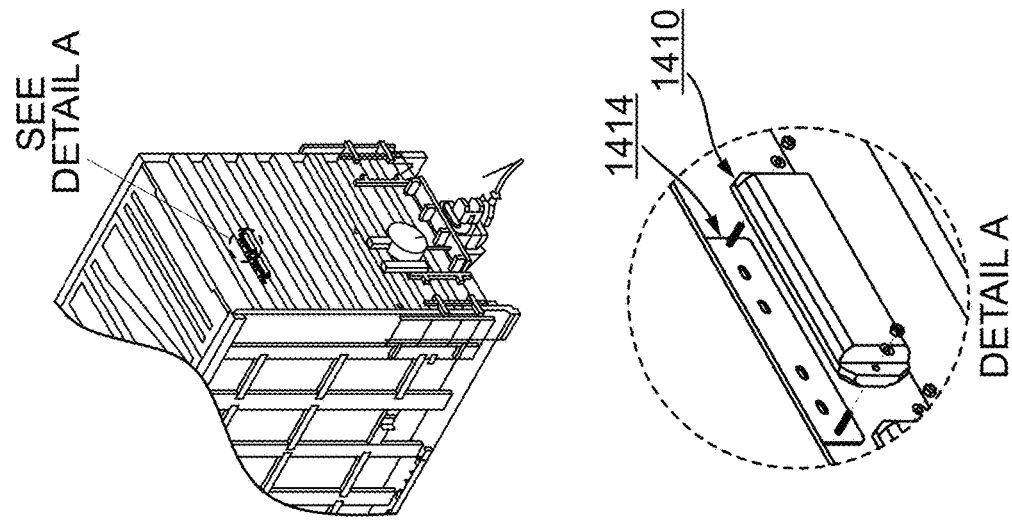
Figure 15:
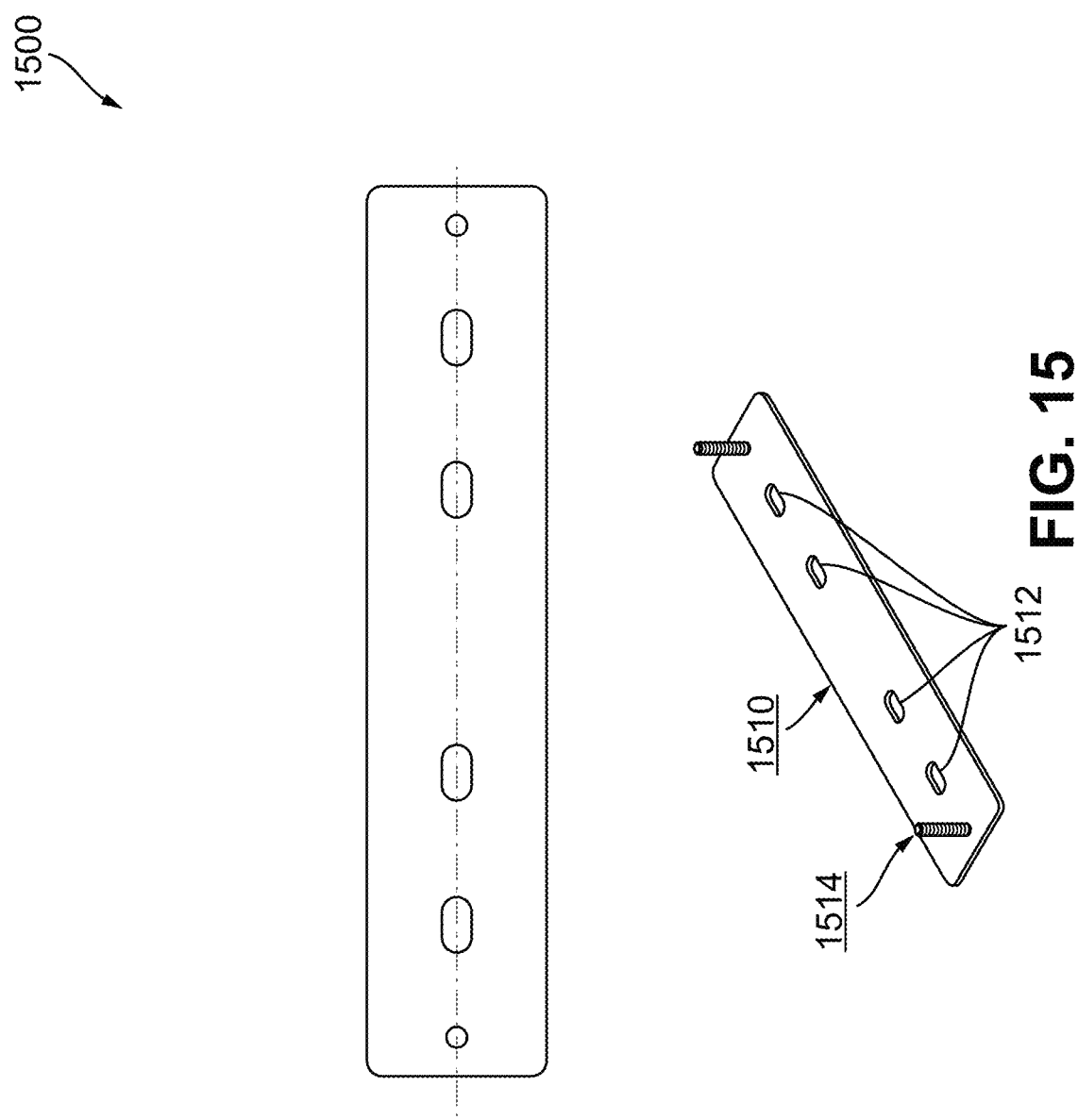

Remote monitoring devices capable of determining the location of an object using GPS, WiFi, cellular, radio, and/or any form of wireless signals can be mounted in a variety of locations on the object. A variety of bracket designs and mounting locations for remote monitoring devices to measure location information are shown in FIGS. 13-15. As shown in FIG. 13, a remote monitoring device 1310 can mount on the rear face of a boxcar 1312. A bracket 1314 can be tack welded onto the face of the boxcar 1312. As stress propagation may not be a concern in this area of the boxcar, tack welds can be used with a variety of bracket designs. As shown in FIG. 14, a remote monitoring device 1410 can mount on the rear face of a boxcar 1412. A bracket 1414 can be tack welded onto the face of the boxcar 1412. The remote monitoring device may fit over two threaded studs and secures with two locknuts. As shown in FIG. 15, the mounting bracket 1510 can be a flat piece of sheet metal with a number of slots 1512 for welding to the door wall and/or face along with two threaded studs 1514 for attaching a remote monitoring device.

A variety of brackets and mounting locations for mounting remote monitoring devices to rail cars are described with respect to FIGS. 3-15. However, it should be noted that remote monitoring devices and/or a variety of other sensors can be mounted to any of a variety of objects on a railcar with any of a variety of brackets in accordance with embodiments of the invention. In several embodiments, a hunting monitor can be attached with a plate with two studs, attached near the deck height at the lateral centerline of the car directly above the trucks. In many embodiments, a longitudinal impact monitor attaches via a plate bracket with studs to the end sill of the car nearest the coupler opening and lateral centerline of the car. In a variety of embodiments, a brake system monitor attaches via a plate bracket with studs nearest to the points at which the air pressure is measured. Wires encased in conduit can be run to the air pressure sensors that attach to the air brake pipes through threaded fittings. These threaded fittings can be welded to the pipe via saddle weld fittings, tapped couplings, tapped elbows, and/or bolted between flanges with a tapped wafer flange fitting. In a number of embodiments, a handbrake monitor can be attached to the car structure via a welded plate with studs nearest a brake lever. A reed switch can be mounted in the housing with a magnet attached to the handbrake lever. The housing with reed switch can be positioned and welded to the deck such that the reed switch will measure the released position. In many embodiments, a reed switch can be a magnetic reed switch. However, it should be noted that any sort of switch or inductive switch as appropriate.

Remote Monitoring Processes

Remote monitoring devices can utilize any of a variety of location monitoring devices and techniques, such as GPS receivers, cellular tower triangulation, and/or WiFi triangulation, to determine the location of the remote monitoring device. The location monitoring devices can be built into a data transmission unit mounted at the end of a rail car to ensure the best signal reception.

Rail cars can utilize coil springs in their trucks (a.k.a. bogeys) to absorb vertical bumps and provide bump damping. The weight of the empty railcar compresses these springs, and as the railcar is loaded more heavily, the springs in the trucks compress further, causing the distance between the sprung mass, such as a car body, and fixed position components, such as side frame, to decrease. A variety of embodiments can measure the distance between the truck bolster and the side frame, or the car body and the rail, or the car body and the ground. Distance sensors can be utilized to measure the spring compression by monitoring the distance between car body and side frame with non-contact distance sensors. Light-based time-of-flight sensors can be used to measure vertical distance between the car body and side frame. This sensor can be housed in a sensor unit that communicates to a remote monitoring device via short-range radio communication protocol. After a measurement is taken, the sensor sends the data to the remote monitoring device. Laser time-of-flight sensor can be used to measure vertical distance between car body and side frame. This sensor can be housed in an enclosure that includes a cellular radio, and the data is collected repeatedly for several hours and subsequently sent as a batch of historical data in a single message.

Distance measurements can be used to determine door status, such as open or closed, and/or for monitoring car loading. Car loading can be calculated based on measured spring compression in the trucks by measuring distance from car body to side frame as the car body moves vertically in relation to side frame as load changes. In many embodiments, the distance measurement can be used to detect the presence of a container or trailer loaded inside a well or on a spine car. Additionally, the length of the container or trailer can be determined by measuring the fixed reference to the end of the trailer or container.

Figure 16:
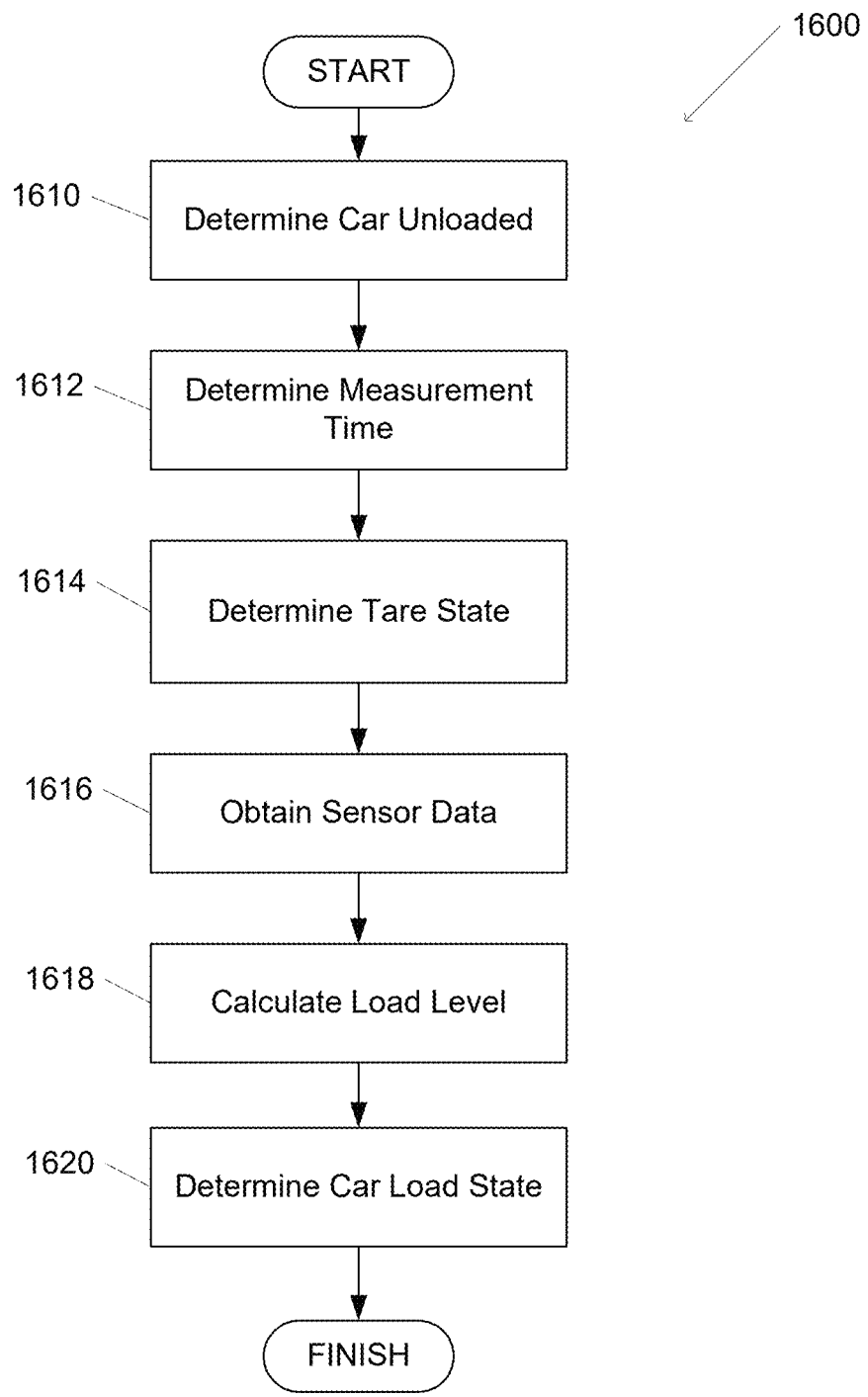
FIG. 16 is a flowchart conceptually illustrating a process for determining a car loaded state in accordance with an embodiment of the invention.

FIG. 16 is a flowchart conceptually illustrating a process for determining a car loaded state in accordance with an embodiment of the invention. Some or all of the steps of process 1600 may be performed using one or more computing devices as described herein. In a variety of embodiments, some or all of the steps described below may be combined and/or divided into sub-steps as appropriate.

At step 1610, a car unloaded state can be determined. A car unloaded state can be determined based on the expected height of the springs. In a variety of embodiments, the expected height of the springs can be determined based on an initial spring height and a calculated spring usage. Additionally, spring rates can be calculated from the spring grouping and truck system. Spring properties are specified by AAR (Association of American Railroad) standards, including coil diameter, bar diameter, solid height, solid capacity, free height, and condemning criteria. These properties can be used to determine the force required to deflect each spring, and summed for all springs on the railcar. Measuring the spring deflection through onboard monitoring and applying the calculated spring rate can be used to determine the total force on the springs, and thus the load on the car. The calculated spring usage can be determined based on previous car loads, lifetime spring compression, car travel distance during the lifetime of the springs, and/or any other factors as appropriate. In this way, the calculated spring usage can be used to correct for fatigue, spring deformity, and/or any other factors that can cause the total spring height to be higher or lower than the initial spring height.

At step 1612, a measurement time can be determined. The measurement time can indicate the testing period to determine a default unloaded state of the car. The measurement time can include a sampling period and a duration. In many embodiments, the measurement period is two weeks of data points collected each hour. However, any duration and/or sampling period can be used as appropriate.

At step 1614, a tare state can be determined. The tare state can indicate the default spring height when the car is unloaded and accounts for the motion of the car. This is important as the weight of the car can cause the springs to compress while the car is moving due to track perturbations even when the car is unloaded. In many embodiments, the tare state is determined based on sensor data indicating the spring height when the car is unloaded and has been stationary. The sensor data can be obtained based on the sampling period for the duration indicated in the measurement time. The tare state can be calculated based on the average spring height indicated in the sensor data. In many embodiments, the tare state can include subtracting an expected spring height from the calculated tare state. In many embodiments, the expected spring height is approximately 11 centimeters. However, it should be noted that the expected spring height can vary between railcar types, spring arrangements, truck types, and/or overall age and wear of the car. It should be noted that any expected spring height can be used as appropriate.

At step 1616, sensor data can be obtained. The sensor data can be obtained when the car is in use. The sensor data can indicate the spring position while the car is at rest or moving.

At step 1618, a load level can be calculated. The load level can indicate the current height position of the springs. The load level can be calculated based on the tare state and the current spring height positon. The current spring height position, tare state, and total potential travel of the spring can be used to calculate a percentage that the spring is currently compressed relative to the total potential compression of the spring.

At step 1620, a car load state can be determined. The car load state can be determined based on the current compression of the spring. When the spring is compressed over a loaded threshold, the car load state can be indicated as loaded. For example, the loaded threshold can be 40% such that when the springs are compressed more than 40% the car can be considered loaded. When the spring is compressed less than an unloaded threshold, the car load state can be indicated as unloaded. For example, when the spring is compressed less than 30%, the car can be considered unloaded. It should be noted that any threshold values can be used as appropriate.

It should be noted that the condition of the car, including one or more structural elements of the car, can be monitored. When it is determined that a wear event has occurred for a particular element of the car (e.g. a spring becomes permanently deformed and has an unsprung height of 10 cm instead of the typical 11 cm), the tare state of the car can be automatically recalculated according to a variety of processes described herein. In this way, the load level for the car can be accurately determined based on the current condition of the car.

Door monitoring can utilize the same physical hardware as load condition monitors. In several embodiments, door monitoring measures ambient light received by the collector used for distance measurement. The sensor can be mounted internally to the rail car, which allows it to measure the internal ambient light. When the door is open, ambient light should increase, and when the door is closed, ambient light should decrease to almost complete dark. This sensor can be housed in a sensor unit that communicates to a remote monitoring device via short-range radio communication protocol. Door monitoring devices can utilize the same physical hardware as the load condition sensors that report a distance measurement. The sensor can be housed in an enclosure that includes a cellular radio, and the data is collected repeatedly for several hours and subsequently sent as a batch of historical data in a single message. The conversion from measured distance to door status can be performed by a remote monitoring device and/or a remote monitoring server system. For example, when the measured distance is below a prescribed amount, the door stop is close enough to the opposite door to conclude that the door is closed. Similarly, if the distance is greater than the prescribed amount or no distance is measured (due to inability to "see" the door stop via reflected laser signal if it is too far away), the conclusion is that the door is open.

Information generated from sensors can be consumed and processed by the remote monitoring devices and/or remote monitoring server system. Processing by the remote monitoring devices can allow for real time analysis and alert generation of information. For example, a temperature sensor on the wheel can detect high temperatures (raising temperature) without a change in brake pressure indicating there is a stuck brake or hand brake applied. A brake system pressure sensor can measure air pressure on a trainline pipe, brake reservoir, cylinder pipe, and/or the empty load pipe, to determine conditions of the air brake system. One potential condition that can be determined is whether the air brakes are being applied or released by comparing the pressure in the trainline pipe to the brake reservoir. An additional condition that can be determined is whether the correct air pressure is being achieved in the brake cylinder by comparing the pressure of the brake cylinder to the trainline pipe. An additional condition that can be determined is whether the empty load system is operating correctly by comparing the empty load pipe pressure to the brake cylinder and trainline pressure. The empty load system pressure can further be scrutinized by comparing the empty/loaded condition of the railcar and the air pressure achieved in the brake cylinder. By measuring the pressure in the locations mentioned, one can determine if the brake system is functioning as intended, or if components of the brake valve, brake cylinder, or components of the empty load system are functioning correctly. Pressure sensors installed on the brake system pipes are predominantly used to measure the air pressure in the pipe, but may also measure humidity in the pipe, and temperature of the air in the pipe. Measuring air pressure can be used to determine a variety of characteristics of the braking system, including but not limited to determining how often air brakes are used on various types of equipment, how long brake are applied for when they are used, geographic locations that brakes are used more than others, and/or relating brake applications to other maintenance, such as wheelset replacements, brake shoe replacements, and the like.

Combining the air pressure measurements with other remote monitoring can be used to diagnose and direct maintenance to defective equipment. As an example, the air brake cylinder piston travel can be measured using a time of flight distance measurement device. The piston travel is directly related to the force output of the brake system. Every brake cylinder design has a required piston travel zone of acceptance, of which is visually measured on cars using a tape measure or gage while the brakes are applied with a specific amount of air pressure in the brake cylinder. Operational requirements dictate that this is to be inspected and measured visually while brakes are applied, before a train departs an originating location as detailed in FRA CFR § 232.205. This Class I brake inspection, or Terminal Brake Inspection, can be simplified through the use of remote monitoring by completing the brake pressure monitoring and piston travel monitoring with on-board devices. At any time the brakes are applied, whether in a terminal or in line of road, the cylinder pressure and piston travel can be measured and determined if within the acceptable limits. Maintenance may be directed to specific railcars if it is determined that the cylinder pressure does not match the corresponding acceptable piston travel, indicating the piston travel requires adjustment.

Longitudinal impact, or accelerations of the car body as a result of coupling, draft or buff forces, and in-train accelerations can be measured with a longitudinal accelerometer can be monitored using an impact measurement device. This longitudinal impact measurement device can be mounted to the end sill of the railcar near the coupler opening and measure the acceleration during an impact event. Threshold accelerations can be set on the device, when over said acceleration the device records the acceleration vs. time event. Trending this data over time can help determine if the draft system damping is degrading or requires maintenance. In addition, monitoring the geographic location of large impact events may allow for improvements in personnel training of the location conducting high impacts, or changes in practices at these locations. Further, if a longitudinal impact monitor is installed on a coupler and the car body, the input and response is measured. By comparing the acceleration details of the input and response, a more detailed evaluation of the draft system performance can be completed. For example, if railcar draft systems have similar input and response accelerations, it can be determined that a lack of longitudinal impact protection and/or or longitudinal damping is present and the draft system may require maintenance.

Handbrake state monitoring can be beneficial to determine if a car has been moved with the handbrakes applied. When this occurs, it can be particularly damaging to the wheels and often generates flat spots where the wheels were dragged. An example embodiment may use a remote monitoring device with a reed switch to determine if the handbrake is set or released. This reed switch can be placed in a fixed position near a lever, sheave wheel, brake rod, or chain that moves when the handbrake is applied or released. A magnet can be mounted on the moving component of the brake rigging and be used to activate the reed switch. Ideally, the reed switch monitors the handbrake when it is in the fully released position and the geographic location and movement state of the railcar at the time can be recorded. This will allow users of the data to understand if and where railcars are being used without a fully released handbrake and address this condition with focused training or other means. Additional embodiments of this monitor may use distance measurement to determine the position of a lever, sheave wheel, brake rod, or chain relative to the fixed position. This distance measurement can be used to determine if the handbrake is applied, and a relative measurement of the magnitude of the application. Onboard monitors may use strain gauges within the brake rigging to monitor force on the handbrake linkage. This strain gauge may be attached to a brake rod, within the chain linkages, to a brake pin, or anywhere else within the rigging. This will allow for the remote monitoring of the brake force through the handbrake linkage.

Processed data from the remote monitoring server system may be used to generate events that may improve the value of certain business processes. In many embodiments, a car trip completion event may be triggered when the car arrives at destination as measured by the railcar tracker, doors are opened as measured by the door sensor, and the car transitions from the loaded state to the empty state as measured by the load sensor. This car trip completion event may be used by railcar owners, shippers, or railroads to generate automated messages or notifications.

Processing by a remote monitoring server system can allow for far more complex computations and data blending with existing third-party systems. There are several types of systems that can be integrated, such as rail industry systems (EHMS, EWMA, LCM, CLM, CRB/AAR billing, EDI, etc.), car configuration, car health and component history/health history systems, and publicly available datasets, such as the NOAA weather database. EHMS (equipment health monitoring/management system) is designed to provide alerts and assign actionable work orders to both the car owner and repair agencies authorized to complete these running repairs when adverse conditions are measured. The EHMS system is built using fixed position wayside detectors and has had issues with accuracy and consistency in the past. Remote monitoring devices can be used to validate the accuracy and consistency of the wayside detectors. This will provide an independent check on the car performance before, during, and after the wayside detector. Remote monitoring systems can also provide continuous coverage. Whereas cars might only pass the wayside detectors every now and again, continuous monitoring would allow car owners to see if the cars condition is degrading quickly or slowly, and if when it crosses a wayside detector and/or other landmark of interest, whether or not the measurement from the wayside seemed valid. Remote monitoring systems can flag one-off alerts that issue a work order against the car. For example, EHMS flags wheelset number 1 as high impact. The remote monitoring system can analyze the information available and determine if it has been seeing high impacts or escalating impacts on that wheel to try to confirm the alert. If none are found, the alert would be closed as unjustified. If there were a backing to show that the wheels condition has been declining or the high impact was also detected around the detector, the alert would remain open.

AAR Billing is the term for work completed on a car by a third party that does not need the car owner's permission to perform the repair. For example, if a wheel is bad, preauthorized repair agents can respond to alerts generated by the EHMS system and perform the limited set of work outlined by AAR guidelines. The remote monitoring system can to integrate with this data in order to gain an understanding of when parts were replaced to determine if the performance issues identified where resolved, or if a replacement occurred without a performance issue.

In another example, if a wheel was flagged for High impacts by EHMS, and the remote monitoring system analyzes the sensor monitoring High impacts and check for the next several days or a select mileage (at speed) and validate the high impacts are no longer occurring. If high impacts are still detected, the repair can be marked incomplete or ineffective. The remote monitoring system could then open a new work order to inspect and replace the proper wheelset or parts. The remote monitoring system can also work with billing departments in order to get a refund for incomplete or incorrect repairs.

Remote monitoring systems can also help spot any third party repair agents that are trying to exploit the system by completing repairs that might not have been needed, but are not currently verifiable in today's environment. The remote monitoring system can validate performance issues and see a decline in performance before the part replacement. If the parts condition was still nominal, data to back up a claim that a part or system was functioning properly and any repair done was not warranted can be obtained by the remote monitoring devices. Additionally, the geographic location and time spent at that geographic location using remote monitoring can validate that labor charges and the repairs that were billed by the repair agent were appropriate for that equipment.

CLM (car location messages) from third-party databases can be used to track railcars. These messages can be generated from fixed wayside AEI tag readers. These messages often take some time, such as several hours, to process and reach the end customer. Remote monitoring systems can provide more accurate information about where a car traveled including, which yards it entered, roughly which tracks and switches it travels through in a short amount of time, and even in real time. Remote monitoring systems can to verify the actual mileage traveled, number of starts and stops, and/or average speed between reporting intervals. This will allow for a more accurate view of the railcar's life allowing for better maintenance and reporting to shippers or railroads where the car is currently located. The remote monitoring system can notify repair crews of an inbound train and the order of the cars coming in. It would also be able to notify the repair crews what material is going to be needed, and where the material will be needed. For example, the crews could then stage two wheel sets in the north yard knowing that the train is coming saving 20 minutes of driving with a forklift after the train has already arrived and the crew are trying to find it. The remote monitoring system can also let the crews know the order or importance and prioritize the worse performing cars as of that moment. If two cars need a replacement, the system would rank the performance from the sensors weighting the most recent data the heaviest to ensure immediate problems are resolved quickly. Remote monitoring systems allow crews to better plan out their inventory and work schedules as the trains that frequent given repair locations can actively tell them how many parts are needed within the next week, month, and quarter. Crews would be able to track the location of cars live on demand with a phone or tablet computer, even without internet connection. The remote monitoring system can receive messages from the cars directly when within range of the wireless transmission from the devices. This will ensure that even in the most remote sections of the rail system, users will be able to view the location of railcars superimposed on a map compared to their current location.

Remote monitoring systems can delegate authority to the railcars location. Users will be able to share the active location with authorized users for a given amount of time or until a condition is met. For example, a shipper can be given a link to a webpage that shows the car location on a map. They will continue to receive the latest position on the map until the sensor on the car shows unloaded. Users could request more information superimposed on top of the map including, but not limited to, speed, ride quality index (e.g. a composite metric of impacts and hunting), and estimated time of arrival.

LCM messages are messages sent from a third party database to car owners about the liability ownership of a railcar, such as the railroad pulling the equipment being monitored. Existing systems involve significant processing to clean and validate the ownership filling in gaps and resolving overlapping liability segments.

Remote monitoring systems can be used to determine what parts are on a rail car and what the useful life of the part should be. Remote monitoring systems can measure local environmental conditions, such as weather. The local environmental conditions can be merged with third-party weather information including dew point, humidity, precipitation quantity and type, and any other weather events that might affect the performance or shipment in the railcar. The remote monitoring system can flag cars for inspection that were in a hazardous or high potential for damage weather event. The remote monitoring system can notify shippers that an extreme weather event occurred and the shipments contents should be verified. For example, large forest fires in the path of the railcar, hurricanes, and the like. Humidity data (and any other relevant environmental condition measured by a remote monitoring device) can be used to verify that the humidity and other environmental measures did not exceed given parameters even if an extreme weather event occurs. Weather events can also be considered when determining the root cause of bad performance on a rail car. When cars are seen to experience certain conditions, the remote monitoring system can account for this in the life expectancy of the parts and railcar or future ride quality performance. This can also be used by a remote monitoring system to open a ticket for inspection or replacement of parts. For example, if a rail car was involved in a hurricane, the rail car can be marked for inspection on critical systems to determine if there was water damage on components not already measured with sensors.

Figure 17:
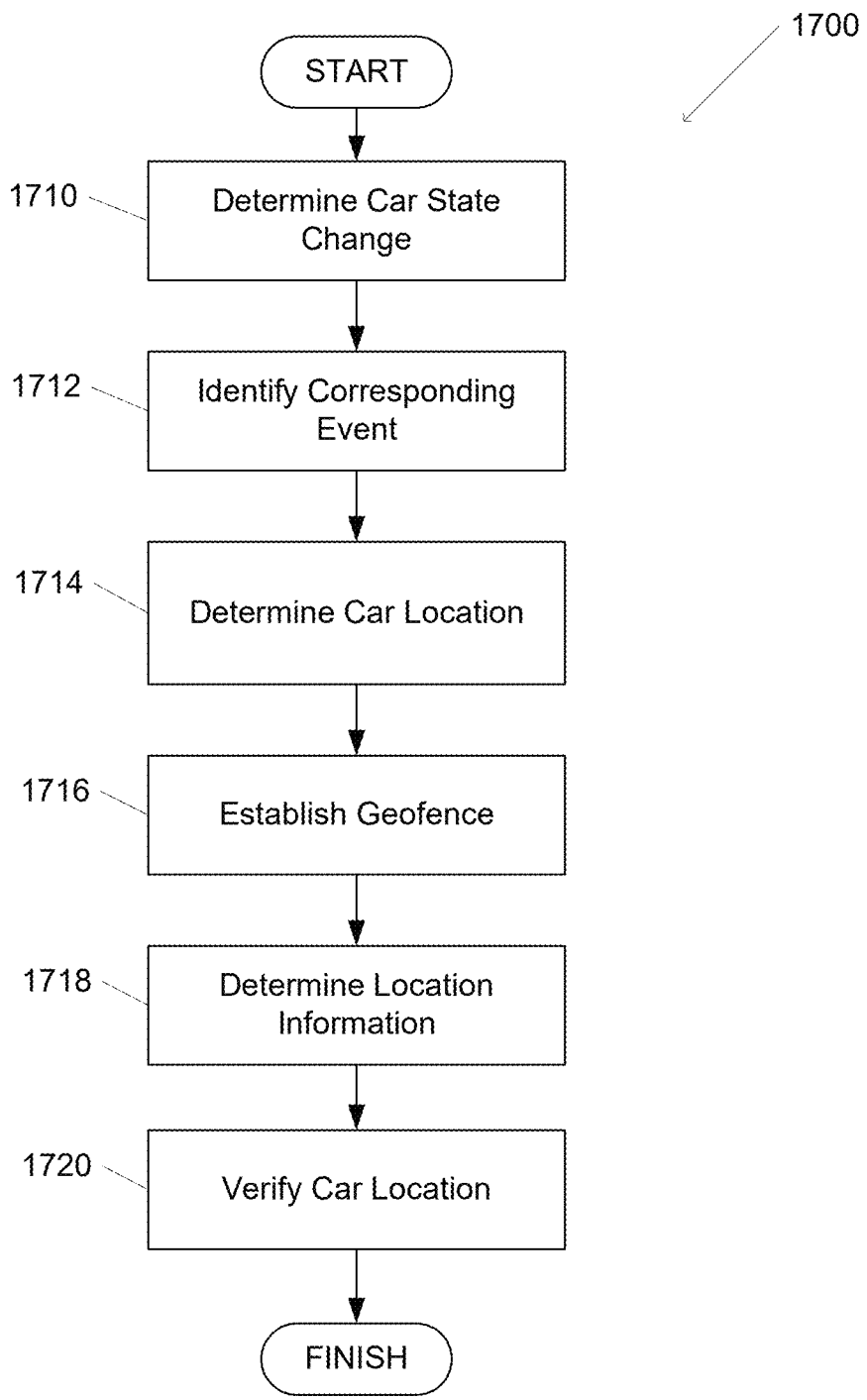
FIG. 17 is a flowchart conceptually illustrating a process for verifying the location of a car in accordance with an embodiment of the invention.

FIG. 17 is a flowchart conceptually illustrating a process for verifying the location of a car in accordance with an embodiment of the invention. Some or all of the steps of process 1700 may be performed using one or more computing devices as described herein. In a variety of embodiments, some or all of the steps described below may be combined and/or divided into sub-steps as appropriate.

At step 1710, a car state change can be determined. The car state change can be determined based on a car load state as described herein. For example, the car state can change from loaded to unloaded and vice versa. In many embodiments, the car state change is associated with an indicated car location and indicates a time at which the car load state change occurred.

At step 1712, a corresponding event can be identified. The corresponding event can indicate a location and the corresponding event location can be associated with the indicated car location. For example, a third party can provide an indication that the car has been loaded or unloaded at the indicated car location. The corresponding event can also indicate an entity name and/or address.

At step 1714, a car location can be determined. In many embodiments, the car location can be determined using a GPS receiver located on the car as described herein. The car location can be determined within a threshold of the time indicated in the car state change. The car location can indicate geographic coordinates (or any other indicator) of the car.

At step 1716, a geofence can be established. The geofence can be centered on the determined car location. The geofence can take any shape, such as a circular area, a square area, and/or any other shape as appropriate. The dimensions of the geofence can be any measurement as appropriate to the location of the car. For example, a smaller geofence can be used in urban areas, while a larger geofence can be used in rural areas. In many embodiments, the geofence is a one-quarter mile square. In a variety of embodiments, one or more sensors can be programed to operate differently based on what geofence they are located. For example, a geofence around a customer site can be used to reprogram a load sensor to reduce the interval for measuring for load state and reporting the load information. In this way, more granular loading information can be generated and obtained when the car is in a location where it is likely to be loaded and unloaded. Similarly, when the car is between customer sites, it is unlikely that the car will be loaded and unloaded so the reporting interval for the load sensor can be reduced to reduce processing demands and improve power efficiency of the device.

At step 1718, location information can be determined. The location information can indicate an address and/or location name. In many embodiments, the location information is determined using a third-party location service that provides addresses and/or location names associated with geographic coordinates. In several embodiments, the third-party location service provides multiple addresses and/or location names. In a variety of embodiments, the address and/or location name being closest to the car location can be used as the address and/or location name.

At step 1720, the car location can be verified. The car location can be verified by comparing the address and/or location name indicated in the location information with the entity name and/or address indicated in the corresponding event. By verifying the car location, activities performed with a car (such as, but not limited to, time loaded or empty, if the car was impacted, handbrake not released, other improper handling, and the like) while the car is under control of the customer can be more accurately determined.

Verifying the car location can also be used to determine if a particular telematics device is located on and paired with the proper car and that the sensor is not malfunctioning or stolen. When the car location and the GPS location differ, either the GPS receiver was associated with the wrong car number and/or or the telematics device is no longer attached to the railcar. This can be used to generate notifications that a telematics device may have been improperly installed and/or stolen.

Figure 18:
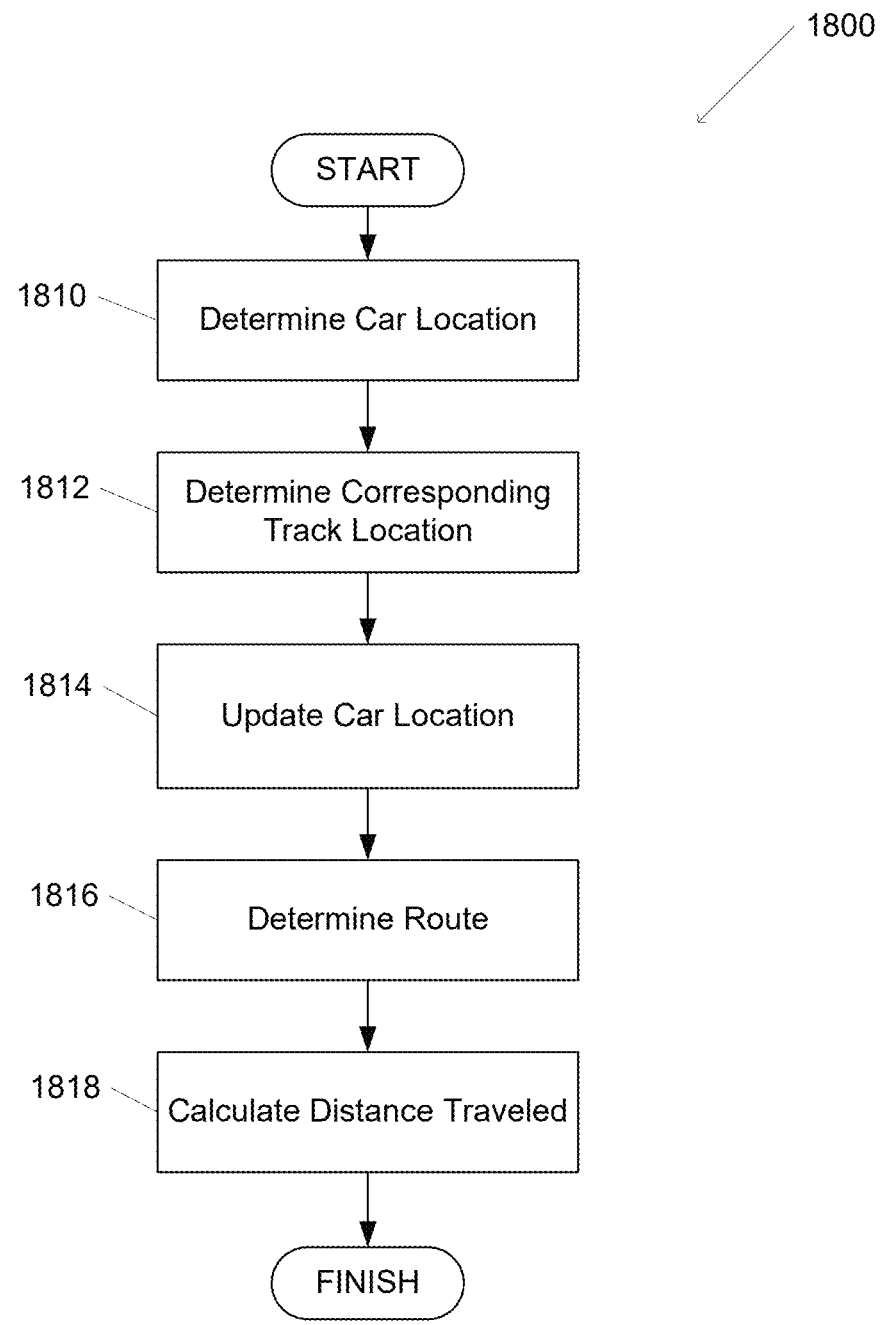
FIG. 18 is a flowchart conceptually illustrating a process for determining a distance traveled in accordance with an embodiment of the invention.

GPS receivers can determine the location of an object with a certain degree of accuracy. However, this location can be affected by the quality of signals received by the GPS receiver and/or the inherent inaccuracy of the GPS system. However, this inaccuracy can often be corrected when determining the location of rail cars, as rail cars are limited to traveling on tracks with a fixed and known location. FIG. 18 is a flowchart conceptually illustrating a process for determining a distance traveled in accordance with an embodiment of the invention. Some or all of the steps of process 1800 may be performed using one or more computing devices as described herein. In a variety of embodiments, some or all of the steps described below may be combined and/or divided into sub-steps as appropriate.

At step 1810, a car location can be determined. The car location can be determined at a particular time. In many embodiments, the car location is determined using a GPS receiver installed on the car as described herein.

At step 1812, a corresponding track location can be determined. The corresponding track location can be a rail track that is located within a threshold distance of the car location. In many embodiments, multiple rail tracks are located within the threshold distance and the rail track closest to the car location is selected as the corresponding track. The location of the corresponding track can be determined based on a database of rail track locations. For example, the North American Rail Network (NARN) database can be used to determine the location of rail tracks in North America. However, any track database can be used as appropriate.

At step 1814, the car location can be updated. The car location can be updated based on the corresponding track location. In this way, the car location can be updated to follow the route of the rail track as indicated in the rail track location database.

At step 1816, a route can be determined. The route can be determined based on a starting point of the rail car, an ending point of the rail car, and one or more car locations. The starting point of the route can be indicated as a geographic location where the car starts moving, and the ending point of the route can be indicated as the geographic location where the car stops moving. The car locations can be determined at a sampling interval while the car is moving between the starting point and the ending point.

At step 1818, a traveled distance can be calculated. The traveled distance can be calculated based on the start point of the route, the end point of the route, and the length of track between the start point and the end point of the route. For example, the length of track can be determined using the rail track location database.

Figure 19:
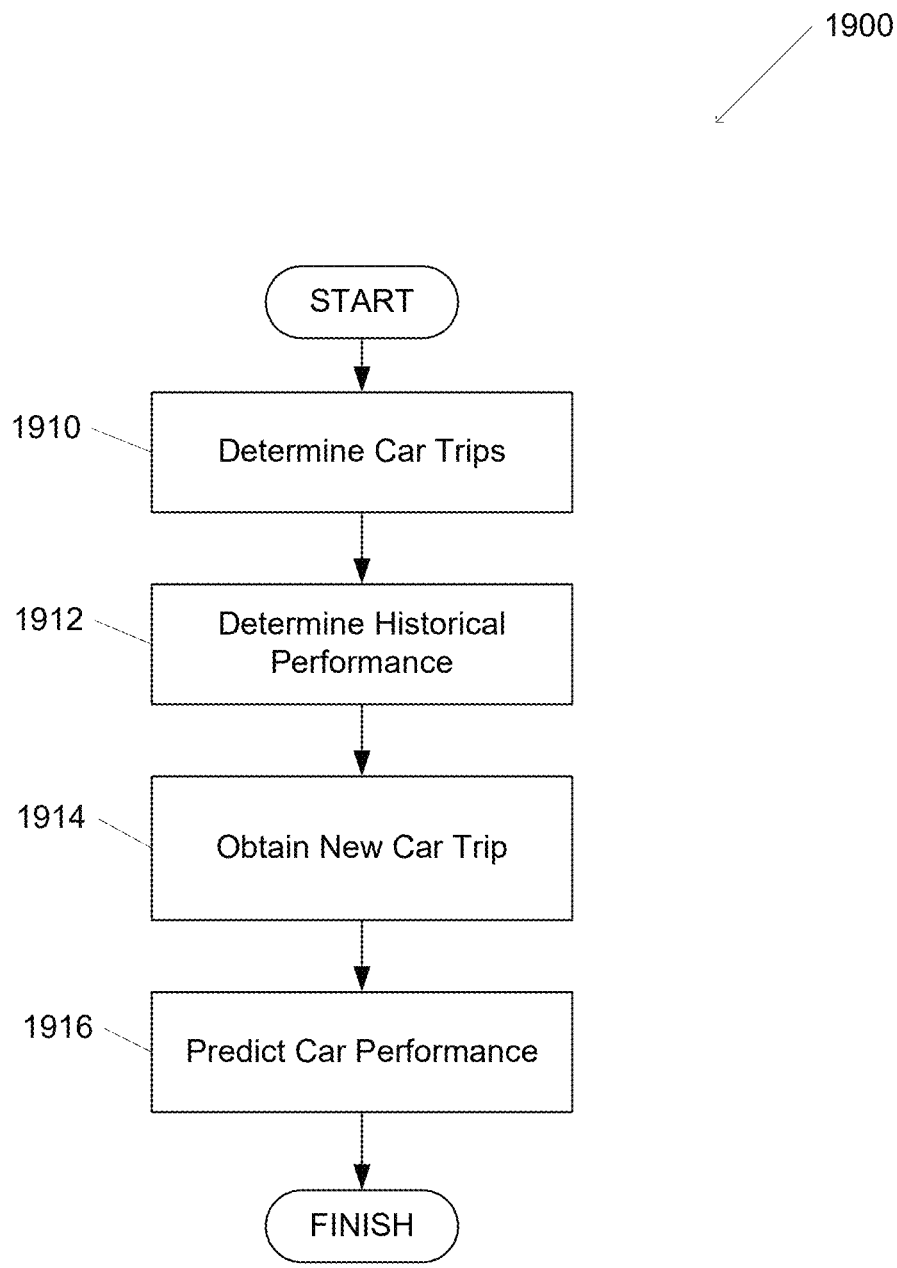
FIG. 19 is a flowchart conceptually illustrating a process for predicting car performance in accordance with an embodiment of the invention.

One advantage of tracking the location and load status of a number of rail cars is aggregating trip data across multiple rail cars over time. This can include looking at the average traveling speed, stopping locations, and nominal car performance by car type in these locations/environments. The historical car performance can be used to predict the performance of future cars traveling on the same routes. FIG. 19 is a flowchart conceptually illustrating a process for predicting car performance in accordance with an embodiment of the invention. Some or all of the steps of process 1900 may be performed using one or more computing devices as described herein. In a variety of embodiments, some or all of the steps described below may be combined and/or divided into sub-steps as appropriate.

At step 1910, car trips can be determined. The car trips can indicate a route traveled by a car, the time at which the car traveled the route, and/or the total time it took the car to travel the route. The car trips can be determined using any of a variety of processes as described herein.

At step 1912, historical performance data can be obtained. The historical performance data can include the car trips for one or more cars that traveled the route. The historical trips can also include the time at which the car traveled the route as differing weather conditions can affect the total speed at which a car can travel a particular route. For example, a car can travel faster through the mountains in the summer than in the winter when snow and ice can affect the maximum speed and/or times at which the car can travel. The historical performance data can also include any other conditions and/or factors associated with a car trip, such as traffic conditions, stoppage areas, and the like.

At step 1914, a new car trip can be obtained. The new car trip can indicate an intended route to be traveled by a rail car and/or the time at which the rail car will be traveling the route.

At step 1916, car performance can be predicted. The car performance can be predicted based on the historical performance data for the route and/or time indicated in the new car trip. In many embodiments, the car performance is predicted using one or more machine classifiers that generate an estimated travel time for the car and/or a confidence metric indicating the likelihood that the car will traverse the route in the estimated travel time. It should be readily apparent to one having ordinary skill in the art that a variety of machine classifiers can be utilized including (but not limited to) decision trees, k-nearest neighbors, support vector machines (SVM), neural networks (NN), recurrent neural networks (RNN), convolutional neural networks (CNN), probabilistic neural networks (PNN), and transformer-based architectures. RNNs can further include (but are not limited to) fully recurrent networks, Hopfield networks, Boltzmann machines, self-organizing maps, learning vector quantization, simple recurrent networks, echo state networks, long short-term memory networks, bi-directional RNNs, hierarchical RNNs, stochastic neural networks, and/or genetic scale RNNs. In a number of embodiments, a combination of machine classifiers can be utilized, more specific machine classifiers when available, and general machine classifiers at other times can further increase the accuracy of predictions.

One or more aspects discussed herein can be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules can be written in a source code programming language that is subsequently compiled or interpreted for execution and/or be written in a markup (or otherwise human-readable) language such as (but not limited to) HTML and XML. The computer executable instructions can be stored on a computer readable medium such as a hard disk, optical disk, removable storage media, solid-state memory, RAM, and the like. As will be appreciated by one of skill in the art, the functionality of the program modules can be combined or distributed as desired in various embodiments. In addition, the functionality can be embodied, in whole or in part, in firmware or hardware equivalents such as integrated circuits, field programmable gate arrays (FPGA), and the like. Particular data structures can be used to implement one or more aspects discussed herein, and such data structures are contemplated within the scope of computer executable instructions and computer-usable data described herein. Various aspects discussed herein can be embodied as a method, a computing device, a system, and/or a computer program product.

Although the present invention has been described in certain specific aspects, many additional modifications and variations would be apparent to those skilled in the art. In particular, any of the various processes described herein can be performed in alternative sequences and/or in parallel (on different computing devices) in order to achieve similar results in a manner that is more appropriate to the requirements of a specific application. It is therefore to be understood that the present invention can be practiced otherwise than specifically described without departing from the scope and spirit of the present invention. Thus, embodiments of the present invention should be considered in all respects as illustrative and not restrictive. It can be evident to the annotator skilled in the art to freely combine several or all of the embodiments discussed here as deemed suitable for a specific application of the invention. Throughout this disclosure, terms like "advantageous," "exemplary" or "preferred" indicate elements or dimensions which are particularly suitable (but not essential) to the invention or an embodiment thereof, and can be modified wherever deemed suitable by the skilled annotator, except where expressly required. Accordingly, the scope of the invention should be determined not by the embodiments illustrated, but by the appended claims and their equivalents.

What is claimed is:

1. A computing device for verifying a rail car location, comprising:
   a processor;
   a spring sensor; and
   a memory storing instructions that, when read by the processor, cause the computing device to:
   establish, based on determining a car location of the rail car, a geofence based on the car location;
   adjust, based on the geofence, a car load state sensor interval for the spring sensor;
   determine, according to the car load state sensor interval, and based on calculating spring usage of a spring associated with the spring sensor, an expected spring height of the spring;
   measure, using the spring sensor, an actual spring height of the spring;
   determine, based on a comparison of the expected spring height and the actual spring height satisfying a threshold, a car load state change for a rail car;
   determine, based on the car load state change, an indicated car location;
   identify an event corresponding to the car load state change, wherein the event comprises an event location corresponding to the indicated car location;
   override a low-power operating mode associated with the processor in response to determining that the car load state change is a high priority event, the override including controlling a short-range communication device to transmit data about the car load state change; and
   verify the car location based on the event location corresponding to the indicated car location and location information.

2. The computing device of claim 1, wherein determining the car location comprises determining the car location based on feedback from a global positioning system receiver installed on the rail car.

3. The computing device of claim 1, wherein the geofence comprises a circular region centered on the car location.

4. The computing device of claim 1, wherein the geofence comprises a polygonal area established around the car location.

5. The computing device of claim 1, wherein the location information comprises at least one location name and corresponding location address obtained from a third-party location service.

6. The computing device of claim 5, wherein:
   the event location further comprises an event location name; and
   verifying the car location further comprises determining the event location name matches the location name.

7. The computing device of claim 1, wherein the car load state change comprises a change from a loaded state of the rail car to an unloaded state of the rail car.

8. A computer-implemented method for verifying a rail car location, comprising:
   establishing, based on determining a car location of the rail car, a geofence based on the car location;
   adjusting, based on the geofence, a car load state sensor interval for a spring sensor;
   determining, according to the car load state sensor interval, based on calculating spring usage of a spring associated with the spring sensor, an expected spring height of the spring;
   measuring, using the spring sensor, an actual spring height of the spring;
   determining, based on a comparison of the expected spring height and the actual spring height satisfying a threshold, a car load state change for a rail car;
   determining, based on the car load state change, an indicated car location;

identifying an event corresponding to the car load state change, wherein the event comprises an event location, corresponding to the indicated car location;

overriding a low-power operating mode in response to determining that the car load state change is a high priority event, the override including controlling a short-range communication device to transmit data about the car load state change; and verifying the car location based on the event location corresponding to the indicated car location and location information.

9. The computer-implemented method of claim 8, wherein determining the car location comprises determining the car location based on feedback from a global positioning system receiver installed on the rail car.

10. The computer-implemented method of claim 8, wherein the geofence comprises a circular region centered on the car location.

11. The computer-implemented method of claim 8, wherein the geofence comprises a polygonal area established around the car location.

12. The computer-implemented method of claim 8, wherein the location information comprises at least one location name and corresponding location address obtained from a third-party location service.

13. The computer-implemented method of claim 12, wherein:

the event location further comprises an event location name; and verifying the car location further comprises determining the event location name matches the location name.

14. The computer-implemented method of claim 8, wherein the car load state change comprises a change from a loaded state of the rail car to an unloaded state of the rail car.

15. A non-transitory machine-readable medium storing instructions that, when executed by one or more processors, cause the one or more processors to perform steps comprising:

establishing, based on determining a car location of a rail car, a geofence based on the car location;

adjusting, based on the geofence, a car load state sensor interval for a spring sensor;

determining, based on calculating spring usage of a spring associated with the spring sensor, an expected spring height of the spring;

measuring, using the spring sensor, an actual spring height of the spring;

determining, based on a comparison of the expected spring height and the actual spring height satisfying a threshold, a car load state change for a rail car;

determining, based on the car load state change, an indicated car location;

identifying an event corresponding to the car load state change, wherein the event comprises an event location, corresponding to the indicated car location;

overriding a low-power operating mode associated with the processor in response to determining that the car load state change is a high priority event, the override including controlling a short-range communication device to transmit data about the car load state change; and verifying the car location based on the event location corresponding to the indicated car location and location information.

16. The non-transitory machine-readable medium of claim 15, wherein determining the car location comprises determining the car location based on feedback from a global positioning system receiver installed on the rail car.

17. The non-transitory machine-readable medium of claim 15, wherein the geofence comprises a circular region centered on the car location.

18. The non-transitory machine-readable medium of claim 15, wherein the geofence comprises a polygonal area established around the car location.

19. The non-transitory machine-readable medium of claim 15, wherein:

the location information comprises at least one location name and corresponding location address obtained from a third-party location service;

the event location further comprises an event location name; and verifying the car location further comprises determining the event location name matches the location name.

20. The non-transitory machine-readable medium of claim 15, wherein the car load state change comprises a change from a loaded state of the rail car to an unloaded state of the rail car.

* * * * *